Oct. 3, 1967   M. L. ANTHONY   3,344,665
INSTRUMENTATION SYSTEMS
Filed April 1, 1964   8 Sheets-Sheet 6
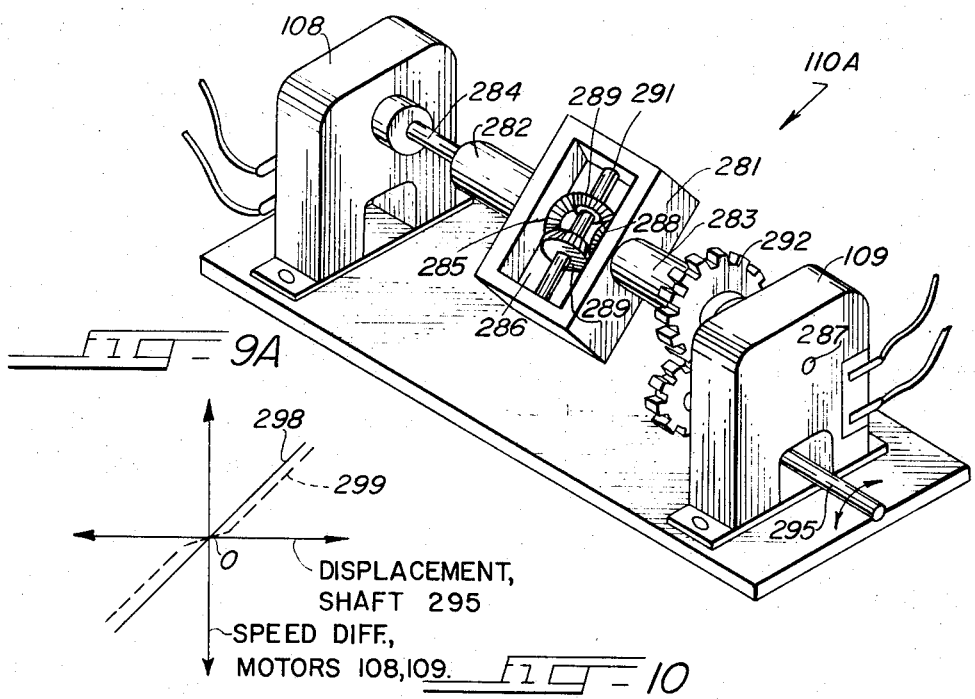
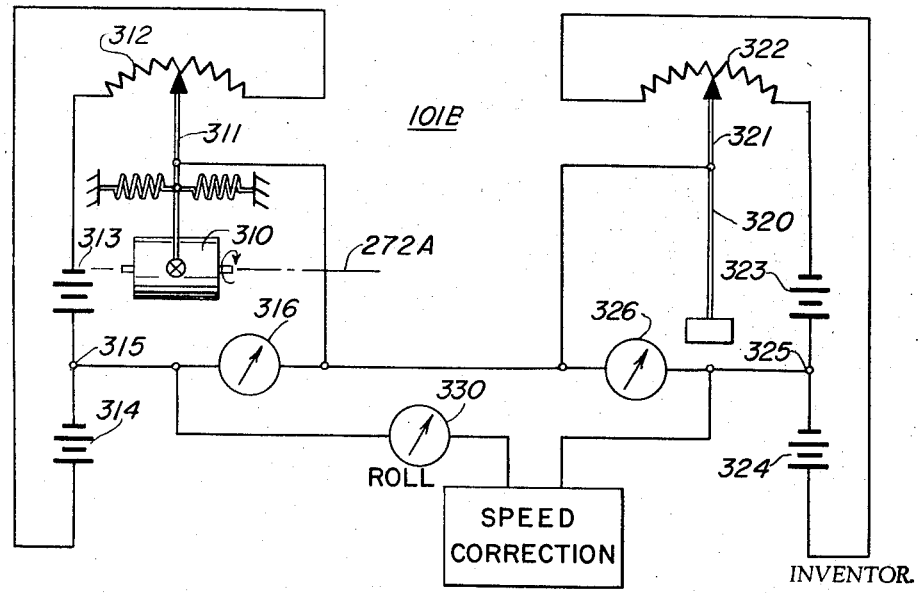
INVENTOR.
MYRON L. ANTHONY
BY
Wallace, Kinzer & Dorn
ATTYS.

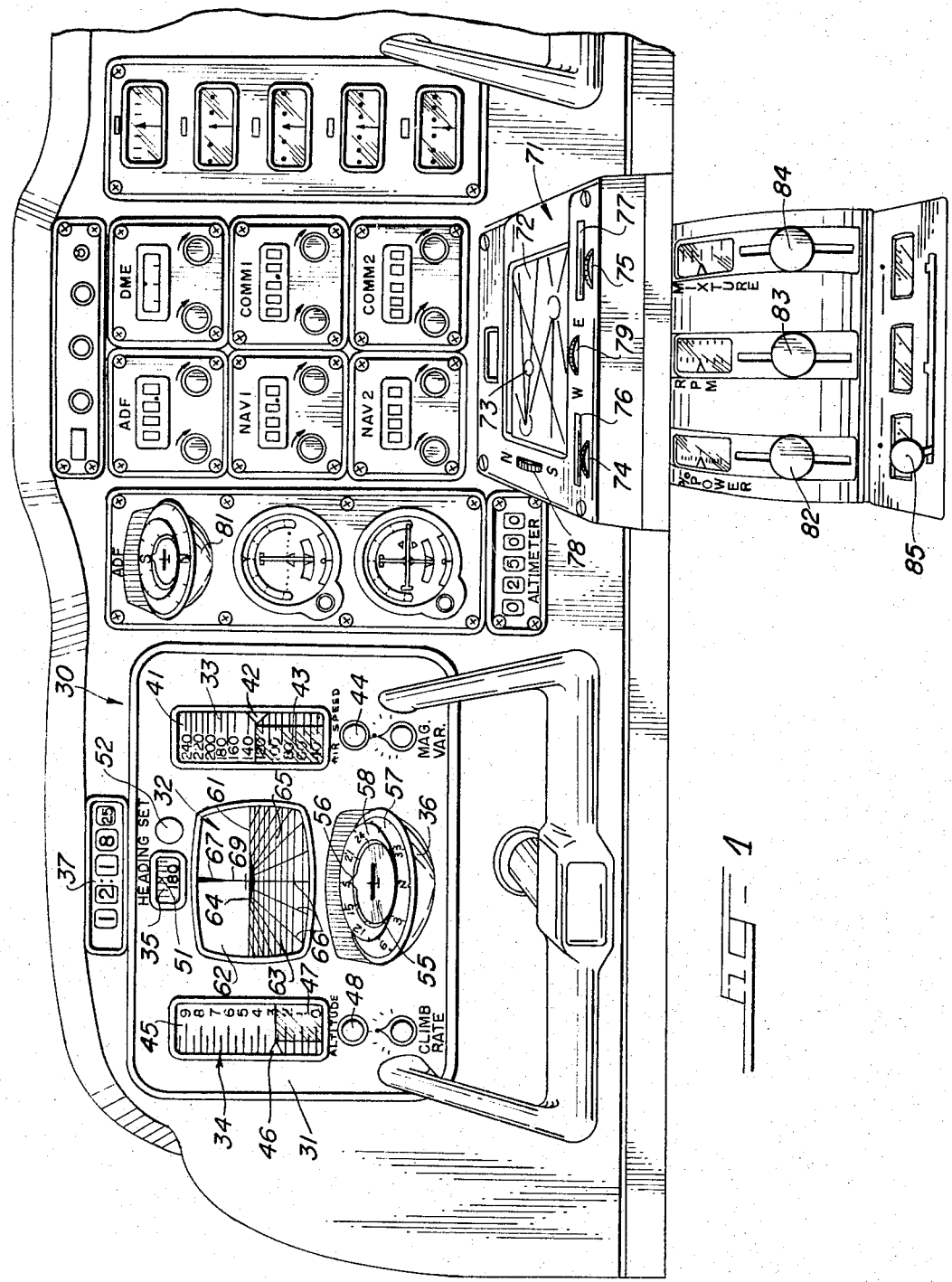

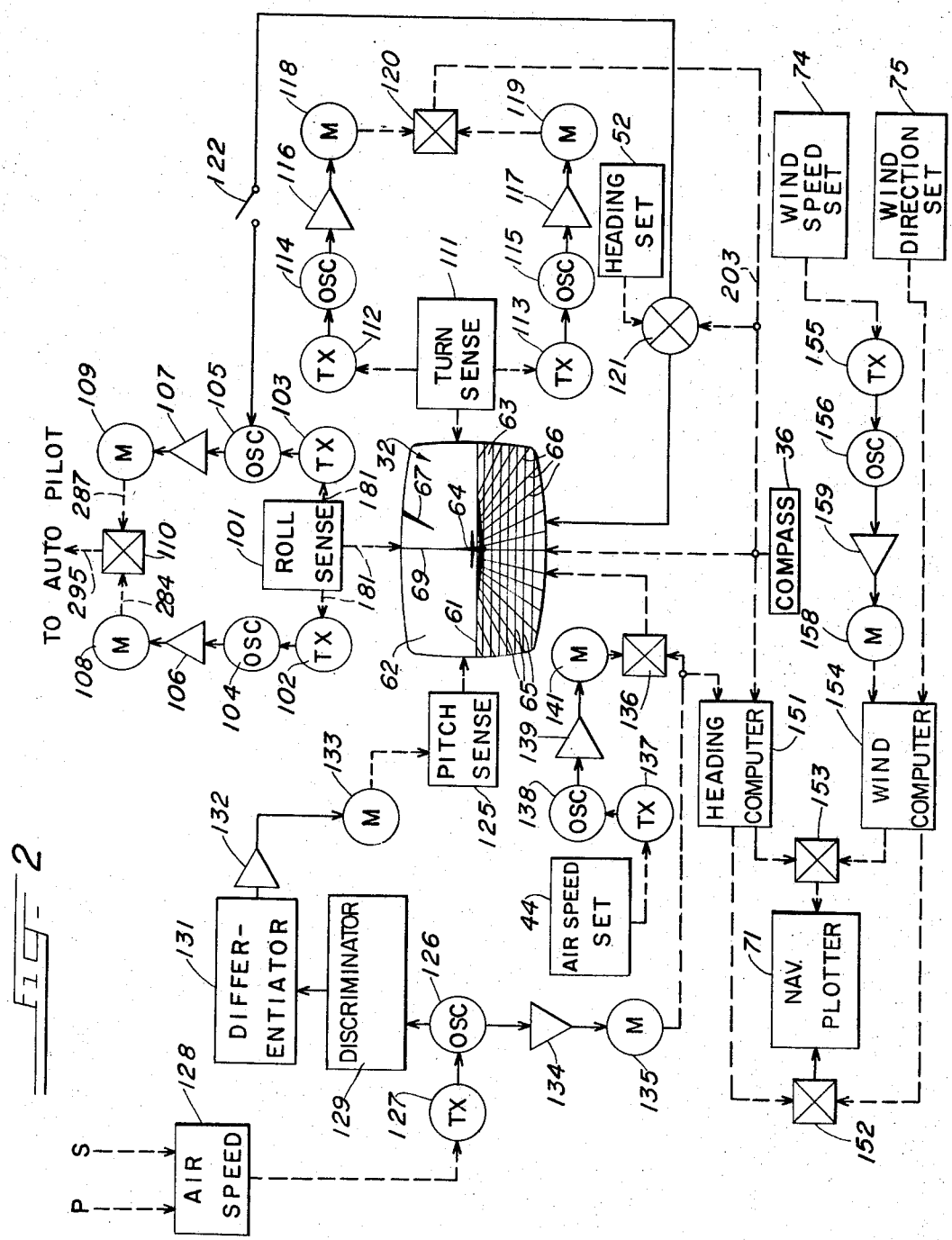

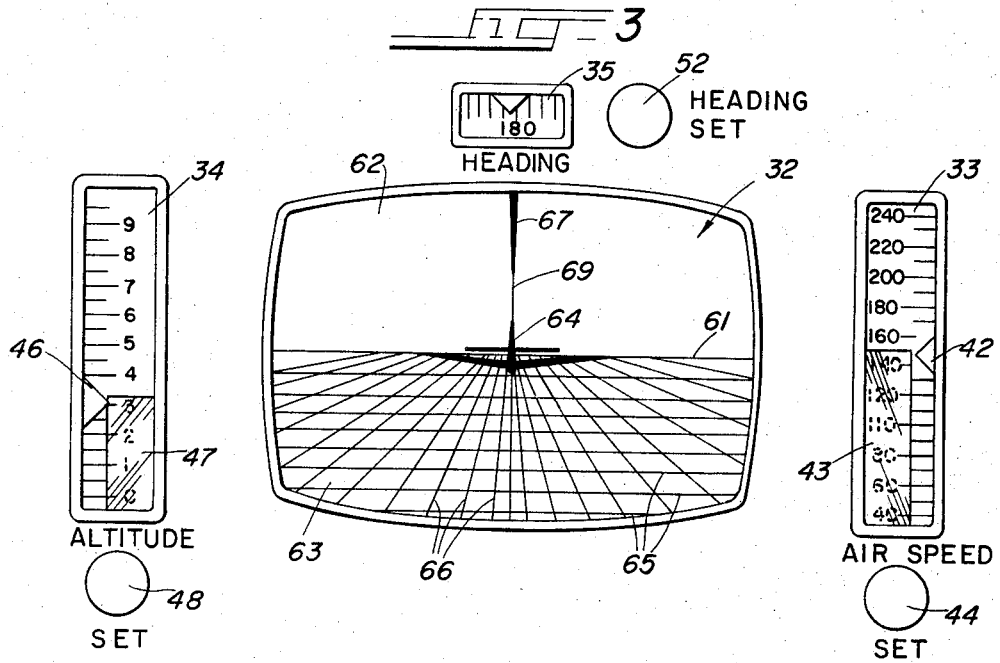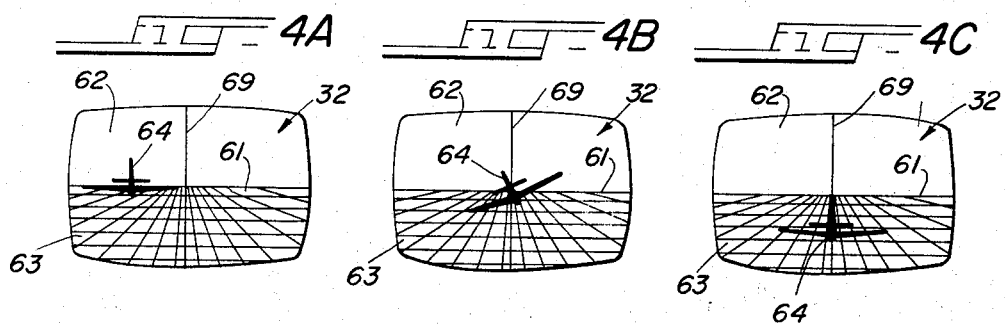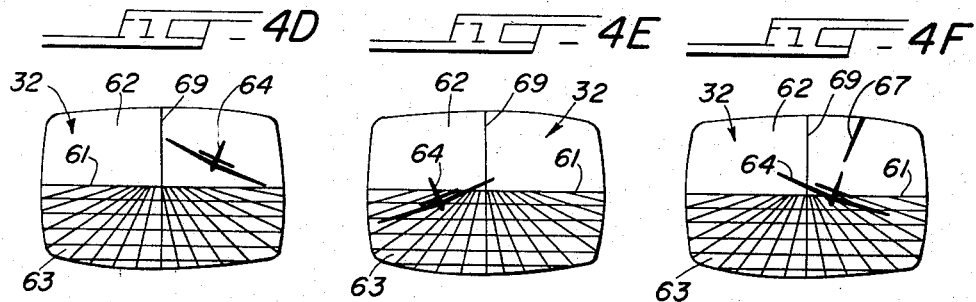

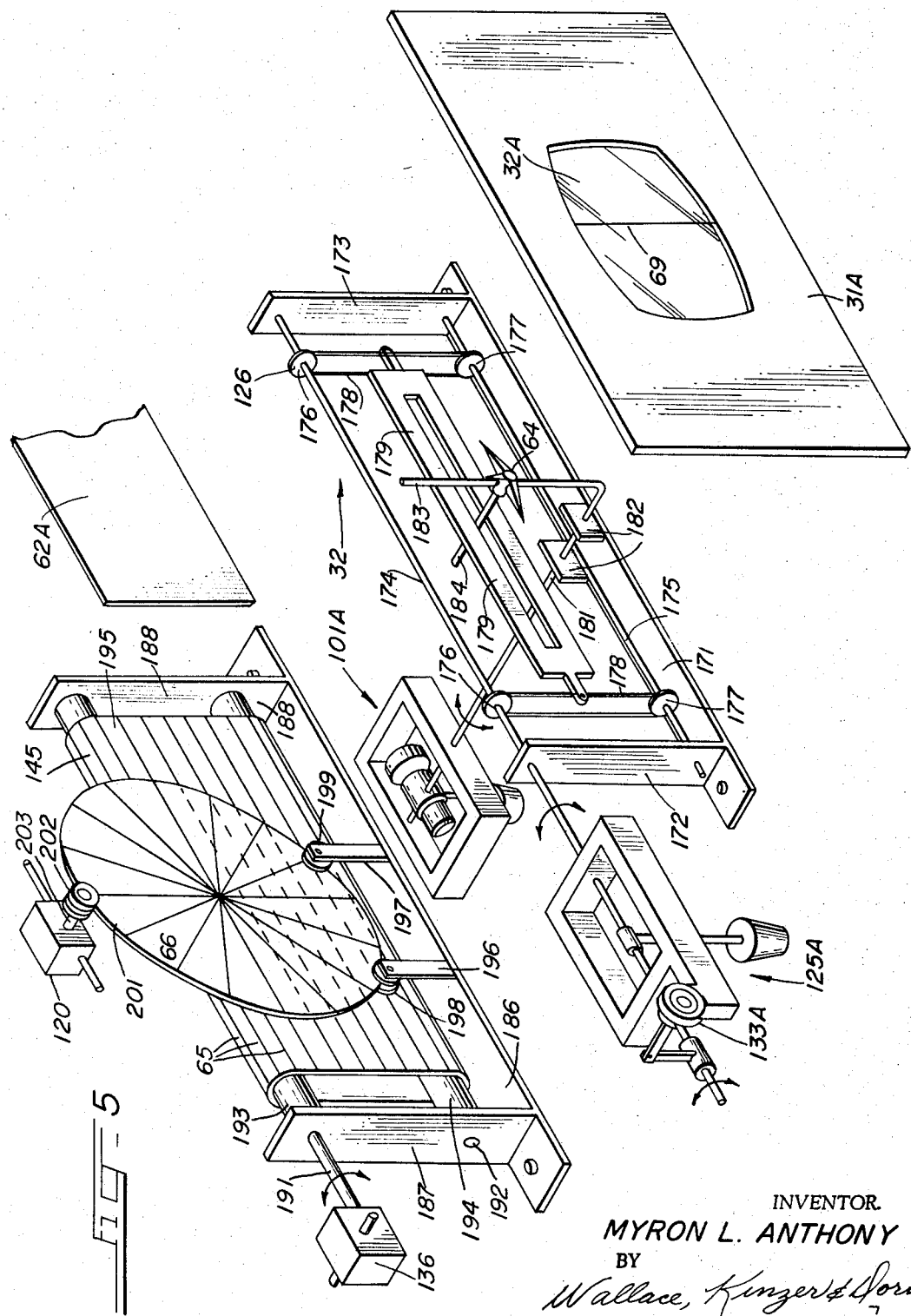

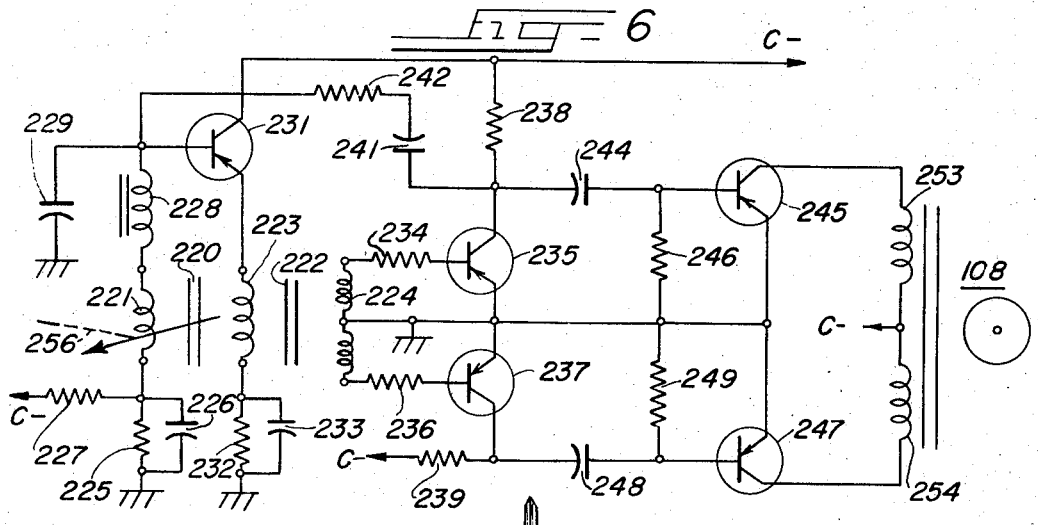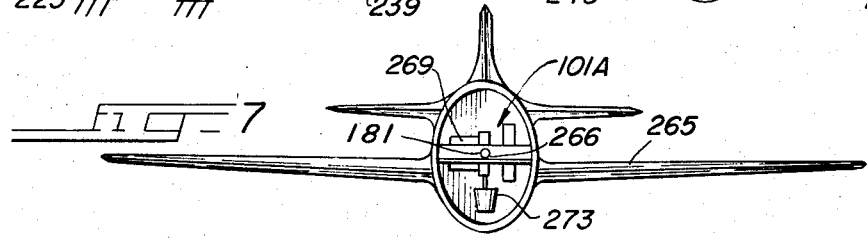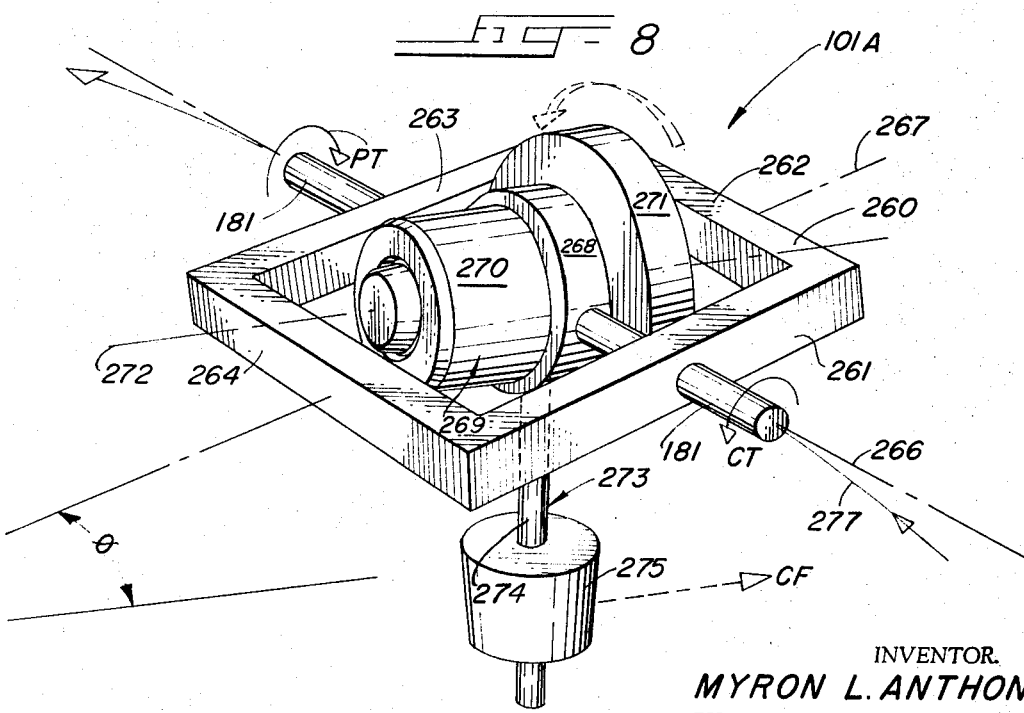

Oct. 3, 1967 M. L. ANTHONY 3,344,665
INSTRUMENTATION SYSTEMS
Filed April 1, 1964 8 Sheets-Sheet 7
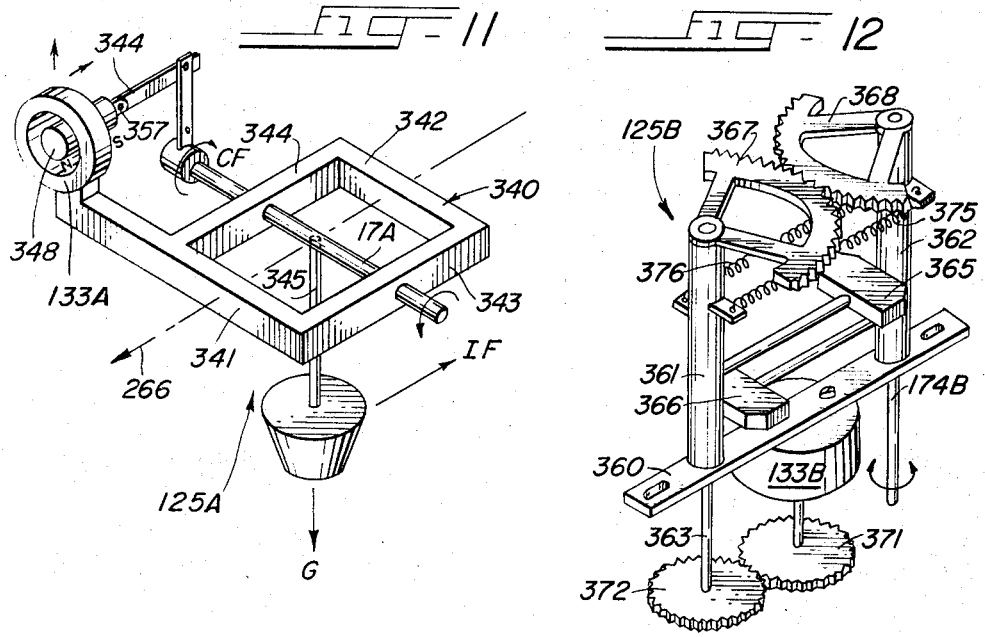
INVENTOR.
MYRON L. ANTHONY
BY
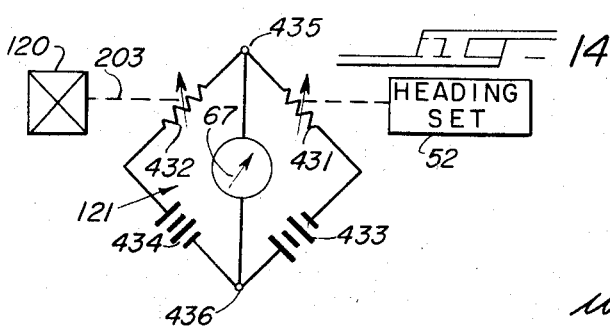

Oct. 3, 1967    M. L. ANTHONY    3,344,665
INSTRUMENTATION SYSTEMS
Filed April 1, 1964    8 Sheets-Sheet 8
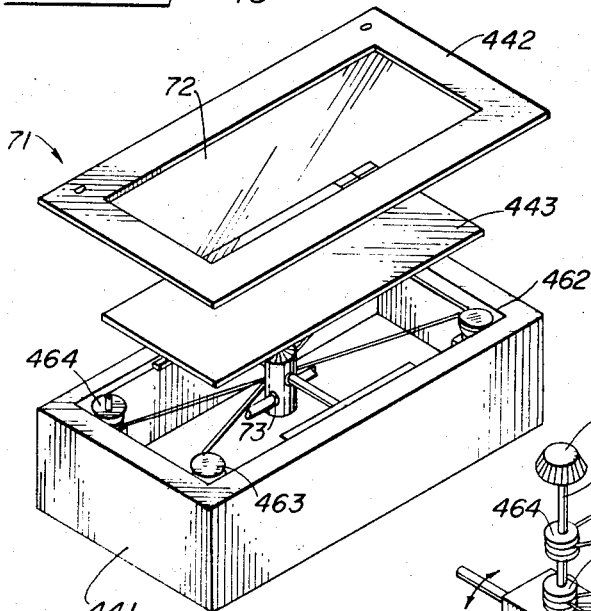
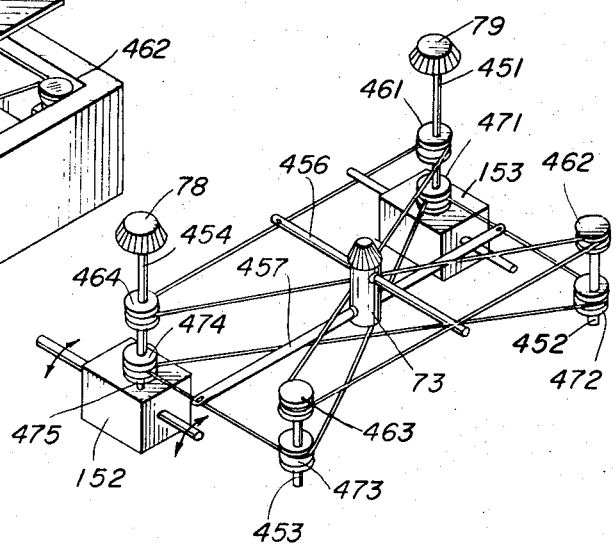
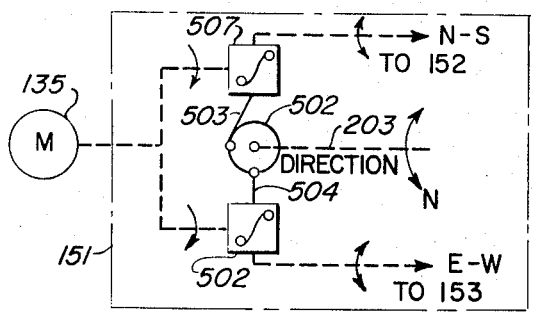
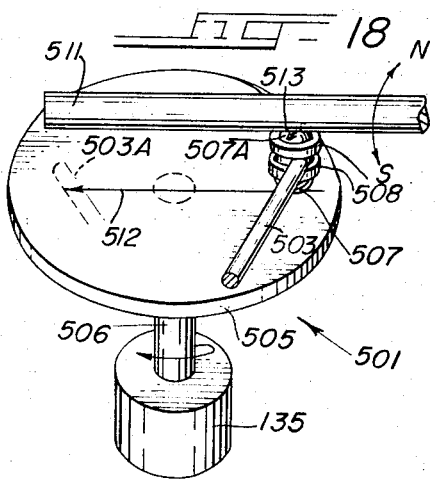
INVENTOR.
MYRON L. ANTHONY
BY
Wallace, Kinzel & Horn
Attys

United States Patent Office 3,344,665
Patented Oct. 3, 1967

3,344,665
INSTRUMENTATION SYSTEMS
Myron L. Anthony, 6040 Brainard,
La Grange, Ill. 60525
Filed Apr. 1, 1964, Ser. No. 356,462
11 Claims. (Cl. 73—178)

This invention relates to a new and improved navigation system for aircraft; more particularly, the invention pertains to a novel instrumentation system that includes apparatus for displaying aircraft performance and position to the pilot for instrument flight purposes, and to the sensing and data processing equipment utilized to actuate and control the display apparatus.

The provision of adequate and usable equipment for instrument flying of aircraft has come to present a multitude of difficult and potentially dangerous problems. In view of the increasing numbers of private aircraft, it has become virtually essential to afford a relatively inexpensive instrumentation system that will enable a pilot having limited training, who flys on relatively infrequent occasions, to master at least the fundamentals of flying by instruments. This is virtually impossible with conventional aircraft instruments, which have been characterized by one administrator of the Federal Aviation Agency as a "steamfitter's nightmare" added to the cockpit of the aircraft in bits and pieces without sensible planning.

Using conventional instruments, some sixty hours or more of training and an additional forty hours or more of flight instruction are required to enable most pilots to obtain even a limited mastery of instrument flying. This initial instruction must be followed by continuing practice on the part of the pilot. Even with this training, instrument flying with known control and display equipment is quite difficult; pilots with many hours of experience frequently find instrument flying to be an exhausting and frustrating experience. Nevertheless, because weather conditions can change rapidly under many circumstances, instrument flight capability of a rudimentary nature has been made a requisite for obtaining even a private flying license.

In comparing flying by visual reference and instrument flying, it is apparent that the aircraft controls and the pilot remain the same. Consequently, the existing disparity between the relative ease of piloting by visual reference and the difficulty of piloting by instrument must lie in the instruments themselves and in the manner in which they present flight information to the pilot. Generally speaking, conventional instruments present flight data to the pilot in a relatively unnatural manner. The psycological effects produced by many conventional instruments are to a substantial extent analogous to working with a mechanism while viewing the mechanism in a mirror. One example is presented by the differences between flying toward an object through visual reference and flying toward the same object by reference to a compass heading.

Virtually anyone can point an aircraft toward a visible object; by the same token, virtually anyone could equally well direct the aircraft along a given compass heading if the compass presentation were physically similar to the visual presentation. A conventional aircraft compass, however, affords what amounts to an inside-out presentation. Consequently, when the aircraft deviates from the selected heading, even experienced pilots must consciously remember which way to turn the aircraft in order to restore it to the proper heading. The correction of the aircraft heading is not a natural and instantaneous reaction to the error information in the form presented by a conventional compass. Moreover, similar difficulties and disadvantages are presented by other conventional flying instruments, such as the gyroscopic attitude indicator, sometimes referred to as an "artificial horizon."

It is a principal object of the present invention, therefore, to present to the pilot of an aircraft an instantly understandable display of the flight performance of the aircraft, in a manner which is essentially analogous to the availability of the corresponding information when the pilot is flying on the basis of visual observation.

A related object of the invention is to provide a single performance display for aircraft instrument flying which affords the aircraft pilot all necessary information with respect to attitude and performance of the aircraft in a manner such that the instinctive reactions of the pilot are the correct reactions for maintaining the aircraft flying in the desired direction and with the desired attitude.

A more specific object of the invention is to present full information with respect to roll, pitch, yaw, speed, and turning of an aircraft, in flight, in a single display and in instantly recognizable form corresponding to the normal and natural viewpoint of the pilot for visual flight.

Another object of the invention is to provide a new and improved display system for instrument flying of aircraft that enables the pilot to preset certain performance criteria for a given flight, including particularly air speed, heading, and altitude, and that presents aircraft performance on the basis of differentials between the preset criteria and actual values to enable the pilot to control the aircraft and maintain the flight in accordance with the preset criteria.

An important object of the invention is to provide a new and improved performance display apparatus for instrument flying of aircraft that permits the pilot to fly by instrument with a minimum of training and a maximum of safety.

During flight, the pilot of an aircraft frequently requires current, accurate information with respect to the position of the aircraft. It is frequently necessary for the pilot to check a variety of instruments and to perform at least some calculations in order to establish the present position of the aircraft. Activity of this kind necessarily diverts the attention of the pilot from the attitude and performance indicating instruments, a diversion that is frequently dangerous under instrument flying conditions.

It is a further object of the present invention, therefore, to afford a single display showing, continuously, the present position and direction of movement of the aircraft, with comprehensive information available to the pilot at a single glance.

Another object of the invention is to afford a convenient and effective means for adjusting a navigational position display device of the dead-reckoning type, used for aircraft instrument flying, for wind vector corrections.

Because an aircraft moves three-dimensionally, and is subject to both angular and linear acceleration forces in a variety of directions, derivation of accurate information with respect to the instantaneous attitude of the aircraft is relatively difficult. Thus, an instrument that affords an accurate indication of rotation of the aircraft about its longitudinal axis, normally referred to as the "roll" attitude of the aircraft, while quite accurate during linear movement of the aircraft parallel to its axis may be quite inaccurate when the aircraft is turning. Similarly, an instrument that detects rotation of the aircraft about its transverse axis, parallel to the wings, usually referred to as the "pitch" attitude of the aircraft, may give completely erroneous information during periods in which the aircraft is accelerated or decelerated.

A further object of the invention, therefore, is to afford improved accuracy in the determination of the instantaneous attitude of an aircraft, particularly with respect to the roll and pitch attitude of the aircraft.

A more specific object of the invention is to develop roll attitude information, with respect to an aircraft, from a simple gyro mechanism and a simple pendulum, one compensating the other. In one roll attitude sensing instrument constructed in accordance with the invention, this is accomplished by a mechanical combination of the precessional gyro mechanism and the pendulum; in another embodiment, the same effect is obtained by combining electrical signals developed separtely from the gyro and the pendulum.

A further specific object of the invention is to develop information pertaining to the pitch attitude of an aircraft in flight, by means of a relatively simple pendulum system compensated for acceleration effects.

In any aircraft instrumentation system, it is virtually always necessary to integrate primary sensed data, with respect to changes in attitude and other performance criteria of the aircraft, in order to present a reasonable display that the pilot may use for flying the aircraft. This is particularly true with respect to position plotting displays, since the aircraft position changes as the time integral of attitude changes on the part of the aircraft. In an aircraft instrumentation system, the integrating apparatus must be capable of working through a zero point, since the aircraft can turn through a full arc of 360° in any direction and can rotate about its own axis through a full circular arc. Most known integrating devices are subject to at least some hysteresis error in the zero region and, consequently, may introduce substantial long-term error in the operation of an aircraft instrument system. By the same token, virtually all known integrating devices are subject to some drift, this being particularly true of all-electronic devices where some temperature changes may occur.

It is an object of the present invention, therefore, to afford a new and improved integrating apparatus for use in an aircraft instrumentation system that effectively minimizes or eliminates errors, and particularly hysteresis errors, in the course of integrating through and around the zero point.

Another object of the invention is to eliminate thermal drift and other long-term errors in the operation of an integration system applied to aircraft instrumentation, and particularly to a direction-indicating and position plotting apparatus.

A specific object of the invention is to provide for virtually error-free integration of flight performance data, in an aircraft, using a simple and inexpensive combination of known devices. In particular, the present invention combines a frequency modulation system with mechanical adding means to afford precision, integration, without substantial drift, including integration around the zero point.

Another general object of the invention is to provide a new and improved simplified compass display constructed to conform to the instinctive reactions of an aircraft pilot and to show the pilot which way to turn, without calculation, to achieve a given heading.

A further object of the invention is to provide a new and improved comprehensive aircraft instrumentation system that is relatively inexpensive, as compared with comparably comprehensive systems constructed with conventional apparatus, yet which facilitates rapid learning of instrument flying at minimum expense.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invvention.

In the drawings:

FIG. 1 is a perspective elevation view of the cockpit of an airplane, illustrating the display devices for an instrumentation and navigation system constructed in accordance with one embodiment of the present invention;

FIG. 2 is a schematic block diagram of a control system constructed in accordance with the present invention and utilized to actuate and control the display devices shown in FIG. 1;

FIG. 3 is a detail view, drawn to an enlarged scale, of the performance display instruments of FIG. 1;

FIGS. 4A through 4F comprise explanatory diagrams illustrating the operation of the principal display device of FIG. 3 under varying conditions of aircraft performance;

FIG. 5 is an exploded perspective view of one form of mechanism usable as the principal display device in the system of FIGS. 1–3;

FIG. 6 is a schematic circuit diagram of a control circuit used in the roll attitude control portion of the system of FIG. 2;

FIG. 7 illustrates the orientation of a mechanical roll sensing device of the invention within an aircraft;

FIG. 8 is a perspective view of the roll sensing device;

FIG. 9 is a perspective view of a differential adding mechanism used in one embodiment of the control system;

FIG. 9A is an explanatory diagram illustrating operating characteristics of certain integrating apparatus used in the control system;

FIG. 10 is a schematic circuit diagram for an electrically operated roll sensing device;

FIG. 11 is a perspective view of one form of pitch sensing device that may be used in the control system;

FIG. 12 illustrates, in perspective, another form of pitch sensing device;

FIG. 13 is a schematic circuit diagram of an acceleration correction circuit usable with the pitch sensing devices of FIGS. 11 and 12;

FIG. 14 is a schematic circuit diagram of an electrical differential device used in the heading control system of the invention;

FIG. 15 is a simplified exploded perspective view of a position plotting display device;

FIG. 16 is a partially schematic perspective view of a drive mechanism for the display device of FIG. 15;

FIG. 17 is a schematic diagram of a computer apparatus used to actuate the position display device; and FIG. 18 is a simplified perspective view of a ball-disc integrator device used in the computer apparatus of FIG. 17.

*General display system*

FIG. 1 is a perspective elevation view illustrating the dashboard 30 of an aircraft that is equipped with a navigation system constructed in accordance with the present invention. At the left-hand side of the dashboard 30 are located a series of performance display instruments that afford the pilot a continuous and complete indication of the attitude, speed, altitude and heading of the aircraft. The principal instrument in this group is an attitude display device 32 that is located in the center of a display panel 31. To the right of the main display 32 there is located an air speed display 33. To the left of the display window 32 there is an altitude display 34. Immediately above the display window 32 is a preset heading display 35. Below display window 32 is a compass-like heading display 36 indicating the instantaneous actual heading of the aircraft. A clock 37 is disposed immediately above the display panel 31.

The air speed display 33 comprises a fixed scale 41. Within the outline of scale 41 there is a movable speed indicator 43 which, in cooperation with the scale, affords an instantaneous display of the indicated air speed of the aircraft. In the illustrated arrangement, indicator 43 is a transparent colored slide. Device 33 further includes a movable command indicator 42 that may be preset to a given speed indication, relative to scale 41, by means of an air speed setting device 44. In the illustrated arrangement, command indicator 42 comprises a pointer that is positioned, by adjustment of device 44, to indicate a predetermined desired speed for flight of the aircraft. The air speed setting or adjustment device 44 is also coupled to the control system that actuates the main display device 32, as described more fully hereinafter.

The altitude display 34 at the left-hand side of panel 31 is generally similar to airspeed display 33. Thus, the altitude display includes a fixed scale 45 calibrated for altitude measurement. An altitude indicator 47 moves up and down with respect to scale 42 to give a continuous indication of the actual altitude of the aircraft. An altitude command pointer 46 is associated with scale 45. Command indicator 46 may be adjusted, by means of an altitude setting device 48, to any given position relative to scale 45 to show the desired altitude for a given flight.

The preset heading display 35 is of simple construction; it comprises a 360° scale calibrated in accordance with the usual compass calibration. The scale is movable relative to a fixed pointer 51. The position of the scale is adjustable by means of a heading setting device 52. As in the case of the air speed setting device 44, heading adjustment device 52 is coupled to the control system for the main attitude display 32 as described in detail hereinafter.

The compass or actual heading display 36, insofar as its operating components are concerned, could constitute a substantially conventional gyro-stabilized magnetic compass. Preferably, it constitutes an integrating device presenting the actual heading as computed from sensed turning movements of the aircraft, as described hereinafter.

The form of presentation, in compass 36, however, is substantially different from most compasses or heading displays. The indicator of the compass comprises a disk-like indicator element 55 mounted in fixed position at the center of the compass and pointing toward the nose of the aircraft. Indicator 55 includes a pointer 56; preferably, element 55 also includes a small representation of an aircraft at the center thereof to show that the indicator always points in the direction of movement of the aircraft. Compass 36 further includes a movable annular scale 57 of substantially triangular cross-sectional configuration with calibrations on the internal surface 58 of the scale. The calibrations on the internal surface 58 of the scale member 57 are thus essentially the same as those that would be provided on the inside of a fixed band rotating about the head of the pilot. Accordingly, it is seen that the compass indication is reversed as compared with an ordinary aircraft compass. The circular scale 57 is mounted horizontally and arranged for observation of the inside of the scale from above, giving the pilot a positive indication of direction and one which corresponds to the directional impressions of the pilot when flying the plane under visual observation conditions.

The attitude display device 32, the main performance display of the system, is a window-like device that includes a frame or other suitable means defining a substantially planar display field. There is a fixed horizon line 61 that separates the display field into an upper sky area 62 and a lower ground area 63. Preferably, the face of display device 32 is transparent, the horizon line 61 being prominently marked on the face plate of the display. A fixed vertical line 69 may be provided across the center of the display field.

Display 32 is provided with an attitude indicator 64 located within the display field comprising the sky area 62 and the ground area 63. It is not essential that attitude indicator 64 bear any particular resemblance to an actual airplane. However, the impression made on the pilot, by the display, is somewhat improved if indicator 64 is given a configuration generally simulating the silhouette of an aircraft as viewed directly from the rear. Attitude indicator 64 is moved within the display field 62, 63 to indicate changes in the attitude of the aircraft, as described more fully hereinafter.

The main performance display 32 is also provided with additional indicator elements located within ground area 63. Thus, the display includes a horizontal grid comprising a series of lines 65 extending across ground area 63 parallel to horizon line 61. In addition, there is a radial grid extending throughout the ground area 63, comprising a series of lines 66, the center of the radial lines 66 being located within sky area 62. However, radial lines 66 do not appear to extend above horizon 61 into the sky area; they are masked off in the sky area. The horizontal grid comprising line 65 and the radial grid comprising line 66 are employed to indicate to the pilot that the aircraft has deviated from preset conditions with respect to air speed and heading of the aircraft, as described more fully hereinafter.

One additional important component of attitude display 32 is a differential command pointer 67 that extends downwardly into the sky area 62 of the display. Command pointer 67 is controlled by a mechanism that is actuated in response to a continuous comparison between the desired preset heading of the aircraft (device 35) and the actual heading (device 36). The position of command pointer 67 changes, within the sky area of display 32, to indicate the direction in which the aircraft must be turned to overcome any deviation from the desired heading, as described in detail hereinafter.

In addition to the instruments on the performance display panel 31, dashboard 30 is provided with a position plotter and display device 71 that projects outwardly of the central portion of the dashboard. The central portion of position display device 71 comprises a transparent window 72 displaying a map of the area being traversed by the aircraft. A small indicator or "bug" 73 moves across display window 72, indicating the instantaneous position of the aircraft. Movement of the position indicator 73 is controlled by the same control system that actuates the performance display instruments of panel 31, as described hereinafter in connection with FIG. 2.

Device 71 further includes two setting devices 74 and 75. Device 74 is a setting device for setting the control system of the invention for a given wind speed, as determined in advance from meteorological data. The wind speed setting can also be adjusted during flight when required. A wind speed scale 76 is located immediately adjacent adjusting device 74 to enable the pilot to check the wind speed setting at any time.

Device 75 is employed to set the control system for a given wind direction. This device is provided with an indicator scale 77 that enables the pilot to check the wind direction for which the control system is set at any time. Devices 74 and 75, in addition to their connections to associated indicator scales 76 and 77, are electrically or mechanically coupled to the control system as described in detail hereinafter in connection with FIG. 2.

There are two additional adjustment devices 78 and 79 associated with the position plotting display 71. Device 78 may be employed to manually adjust the position of indicator element 73 in a north-south direction across the map within display window 72. Similarly, device 79 is employed to adjust the position of the bug 73 in an east-west direction across the position display map. Devices 78 and 79 are employed primarily to set the initial position of the bug to show the location of the aircraft for an initial radio navigational fix when the flight is started, but may also be adjusted while the aircraft is in flight to correct for any detected discrepancies in position, as upon taking a subsequent radio fix.

Near the upper right-hand corner of display panel 31, there is a heading display device 81. Device 81 is a conventional automatic radio direction finder having a display structure that is generally similar to compass 36; it is controlled by the ADF radio equipment in the usual manner.

The remainder of the instruments illustrated in FIG. 1 are essentially conventional. Below position display 71 there are located the usual throttle, propeller, and mixture controls 82, 83 and 84, with suitable indicating instruments. The same portion of the control panel includes the usual fuel tank control 85 with appropriate fuel supply indicators.

Immediately above the position display device 71 are conventional radio instruments for navigation and communication. To the right of the radio equipment are located the engine performance instruments, including the usual vacuum, temperature, oil temperature, oil pressure, and electrical gauges. To the left of the radio equipment, and below compass 81, are the usual radio navigation indicating instruments.

The most important requirement for instrument flying is maintenance of the aircraft in the desired attitude. In the unnatural environment of high speed three-dimensional motion through the air, the normal senses of the pilot, with the single exception of visual perception, are quite unreliable. Fortunately, visual perception is substantially stronger than the other senses that would normally be relied upon by the pilot, the kinesthetic and vestibular senses, enabling the pilot to maintain operation through the information derived visually from the aircraft instruments. Thus, the balance-sensing mechanism of the inner ear, the vestibular system, is quite unreliable when subjected to strong angular acceleration forces, as encountered when the aircraft is turning, and this is also true of the kinesthetic senses derived from pressures on muscles and joints of the pilot.

To maintain the aircraft in the required attitude, and on the desired heading, it is only necessary for the pilot to maintain observation of attitude indicator 64 in the main attitude display 32. The procedure followed by the pilot constitutes a series of simple and natural actions directly related to the procedures followed by the same pilot when flying under visual observation conditions. The difference is that when flying with the instrument display of the invention, the pilot takes the aircraft itself as his fixed frame of reference, a natural action since he cannot rely on impressions of the outside world.

As long as indicator 64 is aligned in balanced relation with horizon line 61 and center line 69, the aircraft is maintaining level flight in a straight line. If the attitude indicator 64 veers to the left of center line 69, the instinctive reaction of the pilot is to turn the plane to the right and correct the heading of the aircraft. This is the correct reaction with the instrument system of the present invention. If indicator 64 rotates counterclockwise, the instinctive impression of the pilot, on a purely visual basis, is that the left wing has dropped and the aircraft is banking to the left. This necessitates rolling the aircraft in a clockwise direction, again the correct reaction required on the part of the pilot to correct a deviation from the desired attitude for the aircraft. A diving movement of the actual aircraft is indicated in display device 32 by downward movement of attitude indicator 64 into the ground area 63 of the display. The instinctive reaction of the pilot is to pull the nose up and regain altitude; again, this is the correct reaction for righting the aircraft.

It is also desirable to give the pilot of the aircraft a positive indication of turning movements of the aircraft and of changes in air speed. An increase in air speed of the aircraft over the setting established by adjustment device 44 is shown in the "window" display 32 by a downward movement of the horizontal grid comprising lines 65. This gives a direct impression, to the pilot, that the plane is flying faster than desired over the ground, with the ground lines rushing back toward the pilot. The instinctive reaction of the pilot is to reduce air speed and this is the correct reaction to return to planned flight conditions. Thus, it is not essential to refer continually to air speed indicator 41; the air speed indicator is merely a more precise instrument that affords a check in the performance display within the "window" afforded by device 32.

Similarly, a rotational movement of the grid lines 66 about their center gives the pilot a visual impression that the aircraft is turning. The grid 66 rotates in a clockwise direction to indicate that the aircraft is turning left. The instinctive reaction on the part of the pilot, to correct this undesired turn, is to turn the aircraft to the right. Again, this is the correct reaction.

During flight under instrument conditions, the pilot actually flys the aircraft in accordance with the visual information derived from display device 32. The peripheral instruments of panel 31 are employed only for an occasional check of the main display and for command setting of the instrument system.

Thus, with respect to altitude display device 34, there is no necessity for the pilot to refer continuously to this device or to attempt to maintain a match between the command indicator 46 and the performance indicator 47. As long as attitude indicator 64 of the main display 32 is maintained in alignment with horizon 31, level flight is maintained and the approximate planned altitude is maintained. The same is true with respect to the air speed display 33. The pilot actually maintains planned air speed by observance of indicator 64 in the main display 32, making only an occasional check of the relative positions of command pointer 42 and performance indicator 43.

The pilot can also check on the heading of the aircraft, independently of display 32, by comparing the preset heading indicated by device 35 and the actual heading indicated by compass 36. In FIG. 1, it is apparent that the pilot is following the correct heading since device 51 is set for a heading of 180° and compass 36 shows that the aircraft is flying due south. If the setting of instrument 35 were 210°, a glance at compass 36 would immediately reveal to the pilot that his heading is incorrect and must be changed. It should again be emphasized that these instruments are employed only as a check on the main display device 32, since maintenance of aircraft indicator 64 in alignment with command pointer 67 is effective to keep the aircraft on the required preset heading.

One important aspect of the compass or heading display device 36 is that any required change of direction is shown to the pilot in a manner that induces a natural corrective reaction. Thus, considering a situation in which the desired heading is 210° and the actual indication of the compass is as illustrated in FIG. 1, with the aircraft heading due south, the natural reaction of the pilot is to turn the aircraft to the right toward the 210° calibration on the compass scale 58. This natural and instinctive reaction on the part of the pilot, to turn the airplane toward the correct heading as shown on the compass, is the correct reaction using the compass 36.

Whenever the pilot diverts his direct attention from main display 32 to the other instruments of panel 31, to plotter 71, or to some other point of interest, he is still able to detect any major change in the attitude of the aircraft. The relatively large-scale movements of the speed grid lines 65 and the radial turn grid lines 62 are instantly noticeable through the peripheral vision of the pilot. Indeed, any movement in the main display 32 indicates some change in aircraft attitude and calls the attention of the pilot back to the display.

Occasionally, the pilot will find it necessary and desirable to refer to position display 71 to determine his present location. This can be done without confusion, since whenever his attention returns to the performance display, a glance at the attitude display device 32 gives an immediate indication as to whether the aircraft has deviated from the planned flight.

On occasion, the flight plan may call for the aircraft to fly to a given radio beacon or other base point and then to change course toward another location. When the pilot, observing position display 71, determines that he has reached approximately the desired position for change of heading, the actual location of the aircraft with respect to the radio beacon or other base point may be determined in the usual manner, using the navigation control radio equipment. If there is a substantial discrepancy between the position of bug 73 on the map and the actual position of the aircraft with respect to the locating point, usually resulting from an error in the wind vector settings, then it is a relatively simple matter for the pilot to determine that deviation, since the distance and direction are both clearly shown on he map. Any deviation will, in virtually all instances, be due to differences between the meteorological information available when the flight was started and the actual wind conditions to which the plane has been subjected. Adjustment devices 74 and 75 may be quickly adjusted to reset the control system for actual wind conditions and the pilot is then able to continue the flight with improved accuracy in operation of the position plotting device.

*General control system*

FIG. 2 is a partially schematic block diagram of a control system constructed in accordance with the present invention and utilized to control the main attitude display 32 and the position plotting device 71. As shown therein, the control system comprises a roll sensing device 101. Device 101, preferred forms of which are described in detail hereinafter, senses rotational movement of the aircraft about its longitudinal axis. Device 101 is mechanically connected to the attitude indicator 64 of display 32 and rotates indicator 64 in a clockwise or counterclockwise direction to afford the pilot a direct indication of the roll attitude of the aircraft.

Roll sensing device 101 is also connected to a pair of transducers 102 and 103. Each of the transducers 102 and 103 is constructed to transform mechanical movement of the roll sensing device into an electrical signal that varies in some respect in response to changes in the roll attitude of the aircraft. Typically, each of these transducers may comprise a rotary differential transformer such as a Selsyn motor, or a rotary transducer of the kind described in Patent No. 2,707,232 to Robert Adler.

Transducers 102 and 103 produce complementary outputs; thus, an increase in the output from transducer 102 is matched by a decrease in the output from transducer 103. Transducer 102 is coupled to an oscillator 104 and is utilized to control the frequency of that oscillator, in essentially the same manner as described in the aforementioned patent to Robert Adler. Similarly, the output signal from transducer 103 modulates and controls the operating frequency of a second oscillator 105.

The output signals from oscillators 104 and 105 are supplied to two individual limiting amplifiers 106 and 107, respectively. The output of amplifier 106 is utilized to drive a first synchronous stepping motor 108 and the output of amplifier 107 is supplied to and drives a second similar motor 109. Motors 108 and 109 may comprise conventional magnetic pulse stepping motors. These two motors are employed to drive an auto-pilot; accordingly, some substantial torque output is required from each motor. In a typical system, the available torque output of motors 108 and 109 may be of the order of eleven inch ounces. The two motors 108 and 109 drive a gear differential 110 that is mechanically connected to auto-pilot driving the ailerons of the aircraft.

The turn attitute control system is in many respects substantially similar to that employed for roll attitude control. Thus, the system includes a turn rate sensing device 111. Device 111 may constitute the operating mechanism of a conventional gyro turn indicator. The yaw sensing device may be mechanically connected to indicator 64 of attitude display 32 to move the attitude indicator to the left or to the right of center line 69 to indicate rotational movement of the aircraft about its vertical axis. On the other hand, the turning movements of the aircraft are shown by the movements of radial grid comprising direction scale 66 and are virtually always accompanied by roll attitude changes. Hence, the connection from device 111 to indicator 64 may be eliminated, as in the case of the display mechanism described in detail hereinafter in connection with FIG. 5.

The turn indicator gyro mechanism comprising turn sensing device 111 is mechanically connected to a pair of variable turns ratio rotary transformers, the transducers 112 and 113. The mechanical connection is such that the signal outputs from transducers 112 and 113 are complementary in nature. That is, a turning movement of the aircraft in one direction increases the amplitude of the output signal from transducer 112 and correspondingly reduces the output signal from transducer 113; a turning movement in the opposite direction increases the output from transducer 113 and decreases the output from transducer 112.

Transducer 112 is electrically coupled, in a frequency control circuit, to an oscillator 114. Oscillator 114, in turn, is coupled through a limiting amplifier 116 to a synchronous pulse stepping motor 118. Similarly, the output signal from transducer 113 modulates the frequency of an oscillator 115, the output signal from oscillator 115 being supplied through an amplifier 117 to a similar small synchronous motor 119.

The two stepping motors 118 and 119 are employed to drive a small gear differential device 120. Differential 120 is mechanically connected to the rotational mechanism for the radial direction scale 62. Device 120 also drives the annular heading scale of the direction indicator, compass 36.

Differential 120 is also utilized to drive an electrical comparator or differential device 121. Although device 121 could be a mechanical device, it preferably constitutes a rotary potentiometer bridge, as described more fully hereinafter, producing an electrical output signal that varies in sign and amplitude depending upon the rotational position of the bridge. Device 120 is also connected to the heading adjustment or setting device 52 (see FIG. 1). Thus, device 121 compares the preset heading (device 52) with the actual heading as determined by integration of turning movements of the aircraft (device 120). The output from device 121 is utilized to drive the differential command pointer 67 through a drive mechanism (not shown) that, in essence, constitutes a conventional electrical meter movement. The differential bridge 121 may also be electrically connected, through a switch 122, to oscillator 105 in the auto-pilot control circuit to actuate the auto-pilot.

A third major input device for the control system shown in FIG. 2 is a pitch sensing device 125. Pitch sensing device 125 constitutes an acceleration-corrected pendulum mechanism, one embodiment of the sensing device being described in detail hereinafter. The pitch sensing device is mechanically connected to attitude indicator 64 of attitude display 32 and is utilized to move the aircraft indicator upwardly or downwardly to indicate to the pilot any changes in the pitch attitude of the aircraft.

Pitch sensing device 125 should be corrected in accordance with changes in acceleration of the aircraft. A principal component of the correction system is an oscillator 126. The operating frequency of oscillator 126 is varied in accordance with the output signal from a transducer 127, which again may be a rotary differential transformer. In this instance, the transducer is driven by conventional apparatus for determining the air speed of the aircraft. This apparatus may include a conventional air speed sensing device 128 having the usual static and pitot tube connections. Inasmuch as apparatus for determining the air speed of the aircraft, including the pitot-aneroid and static-aneroid sensing apparatus, is well known in the art, there is no necessity for a detailed description or discussion of this portion of the control system.

The output signal from oscillator 126 is supplied to a conventional discriminator 129 connected through a differentiator circuit 131 to an amplifier 132. Typically, discriminator 129 may be of the audio-frequency limited-pulse phase-multiplier type. A suitable discriminator that may be employed in the system is described and claimed in Patent No. 3,024,419 of Myron L. Anthony, issued Mar. 26, 1962, although a variety of other discriminator circuits may be utilized as desired. The differentiated output of the discriminator is applied to drive motor 133 in a direction indicative of acceleration or deceleration of the aircraft. Motor 133 is mechanically connected to pitch sensing device 125 to correct the pitch sensing device output for acceleration changes. The amplifier 132 in this circuit is preferably a limiting amplifier.

The output signal from oscillator 126 is also applied through an amplifier 134 to a motor 135. Motor 135, like motors 118 and 119, may comprise a simple and inexpensive magnetic pulse stepping motor having a relatively low output torque. Typically, a motor affording an output torque of approximately one inch ounce may be employed. Motor 135 is utilized as one driving input to a small gear differential 136.

The air speed adjustment or setting device 44 (FIG. 1) is utilized to actuate a rotary transducer 137. The output signal from transducer 137 is applied to an oscillator 138 to vary the frequency of the oscillator. The output signal from oscillator 138 is supplied through an amplifier 139 to a motor 141. Motor 141 constitutes a second input device for gear differential 136. The output shaft of differential 136 is mechanically connected to the apparatus for moving the speed scale comprising the horizontal grid lines 65 of display device 32 either upwardly or downwardly within ground field 63 to indicate to the pilot whether the aircraft is exceeding or has fallen below the preset air speed.

As noted above, the output of motor 133 is representative of acceleration or deceleration of the aircraft. In some instances, it may be preferable to drive grid 65 from motor 133, presenting speed information in the main attitude display from the standpoint of acceleration rather than of a differential relative to the preset speed. Where this is done, an auxiliary display for the differential speed, represented by the output of device 136, is preferably provided.

The differential device 120 that drives bridge 121 and the yaw-movement mechanism for attitude indicator 64 also affords a first mechanical input to a heading computer 151. Computer 151 is also mechanically coupled to the output of motor 135. Computer 151, one form of which is described in detail hereinafter, integrates and resolves the air speed information (afforded by the drive from motor 135) and the heading information (taken from differential 120) into appropriate coordinate movements of the indicator bug 73 of plotter 71. Thus, computer 151 is provided with a north-south output connected to a first differential 152 and with an east-west output connected to a second differential device 153. The two differentials 152 and 153 drive the bug in two coordinate directions to establish the position of the aircraft.

If there were no wind component in the motion of the aircraft, the differential devices 152 and 153 would be unnecessary. However, it is necessary to correct the information from heading computer 151 to take cognizance of the speed and direction of the wind.

To correct for wind conditions, the system is provided with an integrating wind computer 154 that is essentially similar in construction to heading computer 151. Computer 154 has two mechanical inputs, one taken directly from the wind direction setting or adjustment device 75. The second input is derived from the wind speed setting device 74, which drives a rotary transducer 155. The output signal from transducer 155 is used to control the frequency of an oscillator 156, oscillator 156 being connected to a drive motor 158 through a suitable amplifier 159. Again, motor 158 may comprise an inexpensive synchronous pulse stepping motor having a minimal torque of the order of one inch ounce.

The principal controls of the system illustrated in FIG. 2 are described in greater detail hereinafter. Briefly, roll sensing device 101 directly drives attitude indicator 64, rotating the indicator in a clockwise or counterclockwise direction to show changes in roll attitude of the aircraft. The same instrument drives the two transducers 102 and 103 to produce output signals, as noted above, that are complementary in amplitude and polarity. The output signals from the transducers control the frequencies of the two oscillators 104 and 105. The output of each oscillator is amplified and limited, to produce a signal of substantially rectangular wave form, by the associated amplifier circuit. In each instance, the output of the oscillator, after amplification and shaping, is employed to drive one of the stepping motors 108 and 109. Motors 108 and 109 drive differential 110, producing a mechanical output from the differential that is directly related to changes in the roll attitude of the aircraft and is suitable for driving the auto-pilot.

The two variable-frequency generators comprising oscillators 104 and 105 and transducers 102 and 103, being connected in push-pull relationship, tend to reduce errors that might result in the system due to thermal drift or aging of system components. The push-pull system employed also provides automatic correction for non-linearity of transducers 102 and 103. The overall stability of the illustrated system is of the order of 0.01%, using commercial components and known stable circuits, and this accuracy can be maintained over long periods of time and under a wide variety of operating conditions.

The same basic circuit is employed in connection with turn sensing device 111.

As noted above, the turn sensing device 111 may be connected mechanically to attitude indicator 64, but this is not essential because changes in yaw attitude are reflected in changes of aircraft heading, indicated by the rotational movement of the direction scale comprising radial lines 62 in display 32. The principal output from the turn sensing device 111, accordingly, is that derived from the two transducers 111 and 112, which directly control the operating frequencies of oscillators 114 and 115 respectively.

Changes in frequencies of the two oscillators are reflected in variations in rotational speed of the two stepping motors 118 and 119 driving the small gear differential 120. As long as the aircraft flys on a straight line without turning, sensing device 111 detects no change in the yaw attitude of the aircraft. Under these conditions, oscillators 114 and 115 operate at the same frequency and motors 118 and 119 rotate at substantially identical speeds. Accordingly, the output shaft of differential device 120 does not rotate and the radial indicator lines 66 in the display remain stationary. Whenever there is a turning movement of the aircraft, one of the motors 118 and 119 is driven faster than the other, there is an output from differential 120, and the radial grid comprising lines 66 rotates to indicate to the pilot that the aircraft is turning either left or right.

The foregoing description of performance of the turn rate control portion of the system is based upon the assumption that there is no change in the set heading. When a change in heading is desired, the new heading is set into the system by device 52, which adjusts the electrical bridge differential device 121. The resultant disturbance of the bridge balance causes the bridge to produce an output signal that drives the meter movement controlling the differential turn command pointer 67. As a consequence, the command pointer moves to the right or the left, depending upon the direction in which it is necessary to turn the aircraft in order to achieve the desired new heading. The pilot must then turn the aircraft toward the new heading; as the new preset heading is approached, bridge 121 returns toward its balanced condition and command pointer 67 moves back toward its normal alignment with the center line 69 of the display. As the aircraft nears the new heading, the increasing proximity of command pointer 67 to center line 69 automatically guides the pilot in making a smooth flare-out from his turn. Of course, during the period in which the aircraft actually turns, the radial grid 66 rotates, so that the pilot is fully aware of the fact that the aircraft is turning.

In the initial portion of each flight, while the aircraft is being brought to the desired altitude, attitude, and heading, it is usually preferable to leave switch 122 open. Once the aircraft is flying on the desired heading, switch 122 can be closed. Thereafter, if a new heading is set in device 52, the unbalanced output signal from bridge 121 resulting from the heading change is applied to oscillator 105 to create an unbalanced condition between the operating frequency of oscillator 105 and oscillator 104. The resulting unbalanced condition in the roll control system is interpreted by that system as a banking movement of the aircraft, even though no actual bank has occurred and the roll sensing device 101 continues to show that the aircraft is in level flight. The auto-pilot connected to differential device 110 automatically operates to correct this error signal, representing an apparent banking of the aircraft, banking the plane in the opposite direction and therefore turning the aircraft.

When the turning aircraft reaches the new heading that has been set into device 52, the output from bridge 121 again is reduced to a zero level and there is no further output signal supplied from the bridge to oscillator 105. Accordingly, the auto-pilot no longer attempts to correct for the error signal produced by the heading change, and flight is resumed on a level basis.

The control system of FIG. 2 moves the horizontal grid lines 65, sometimes referred to herein as the speed grid or speed scale, in accordance with rate variations between the air speed setting of device 54 and the actual air speed determined by device 128. It will be observed that the control system is essentially identical to that for the roll and turn control systems except that two input devices are used instead of one. Motor 135 is actuated in accordance with directly sensed air speed information from device 128, the control components including the air speed sensing device 128, transducer 127, oscillator 126, amplifier 134 and motor 135. Motor 141, on the other hand, is driven at a speed determined by the setting of device 44 through the chain of control devices comprising transducer 137, oscillator 138 and amplifier 139. Deviations of the actual air speed from the preset air speed are reflected in rotational movement of the output shaft of differential 136, which is driven by the two motors 135 and 141.

If the actual air speed exceeds the preset air speed, then the output shaft of differential 136 drives the speed grid 65 downwardly within window 32, giving the direct illusion that the plane is rushing forwardly over the ground at an excessive rate. Conversely, if the actual air speed is below the preset air speed, the lines of the speed scale move forwardly within the window, creating the illusion that the aircraft has slowed down to a point where it is "backing up." In connection with the speed grid 65 and the radial turning grid 66, rate information is employed instead of actual performance information because the objective of the system is to inform the pilot only with respect to changes from the predetermined flight conditions. Stated differently, there is no necessity for the pilot to gauge the actual speed of movement of either of these grids; if either grid moves, then the pilot knows that the aircraft has deviated from the planned flight.

Pitch sensing device 125 moves indicator 64 upwardly and downwardly within the display field of device 32 to indicate diving or climbing movement of the aircraft. The output from oscillator 126, which is indicative of changes in air speed, is discriminated, differentiated, and amplified in circuits 129, 131 and 132 to obtain a D.C. signal having an amplitude proportional to acceleration of the aircraft and a polarity representative of the direction of that acceleration. That is, the polarity of the output signal from circuit 132 indicates whether the aircraft is accelerating in a forward direction or is decelerating. Motor 133, which is a small D.C. magnetic torque motor, rotates in a direction determined by the polarity of the input signal and through an arc determined by the amplitude of that signal. This affords a correction in pitch sensing device 125 to prevent pitch errors in the sensing device, which would otherwise be occasioned by changes in acceleration of the aircraft, from being displayed. Thus, if the aircraft accelerates forwardly but maintains level flight, pitch sensing device 125 tends to produce an output indicating that the aircraft is climbing. This is corrected by the motor 133 so that the display continues to afford an accurate indication of the actual pitch attitude of the aircraft. The same correction applies, of course, upon deceleration.

Heading computer 151, which is described in greater detail hereinafter, resolves the actual heading information derived from differential 120 of the air speed information from motor 135 into two integrated coordinate movements. The computer is provided with two output shafts, one of which drives differential 152 and the other of which drives differential 153. If there were no wind, the outputs of computer 151 could be used directly to drive the position indicator bug of plotter 71 to shown the aircraft position. Again, it is necessary to correct this information for wind conditions and this is accomplished by the coordinate outputs of the similar computer 154. The computers are described in greater detail hereinafter.

*Main attitude display*

One embodiment of the main performance display 32, described generally hereinabove, is shown in greater detail in FIGS. 3 through 5. When the aircraft is maintaining level flight along a preset heading and at a specified air speed, the position of attitude indicator 64 is as shown in FIGS. 1 and 3. If the aircraft is now deflected into a flat turn to the left, maintaining level flight, the resultant turning movement is illustrated by rotational movement of the radial grid comprising line 66 in counterclockwise direction as well as by rotation of the heading scale of compass 36. If sensing device 111 (FIG. 2) is directly connected to attitude indicator 64, the attitude indicator is moved to the position shown in FIG. 4A, but this movement of the indicator is not essential and may be omitted with a mechanical arrangement of the kind described in detail hereinafter in connection with FIG. 5. A turn to the right, constituting only a change in yaw attitude, would be shown in the display by rotational movement of the direction scale, radial grid 66 in a clockwise direction.

If the aircraft remains in level flight but rolls in a counterclockwise direction, as seen from the rear, a rather unusual condition, the resulting change in roll attitude may be indicated by rotation of indicator 64 to the position shown in FIG. 4B. Under actual flight conditions, a banking movement to the left is almost always reflected in a turn to the left, so that the aircraft indicator is also displaced from center line 69. A corresponding bank of the aircraft to the right is shown on the display by clockwise rotation of indicator 64. Under either circumstance, since a turning movement of the aircraft usually results, the radial grid 66 (and compass scale 57) is rotated to show that the heading of the aircraft is changing.

FIG. 4C shows the display window 32 when the aircraft has nosed down. This movement of the indicator gives a natural illusion of diving movement of the aircraft. Movement of indicator 64 into sky area 62 above horizon 61 gives a clear and instantly interpretable indication that the aircraft has nosed up and is climbing above the desired altitude.

Individual movements of attitude indicator 64 (rotational and translational) as shown in FIGS. 4A through 4C seldom occur in isolation from each other, except in the case of the diving movement of FIG. 4C. More usual conditions are illustrated in FIGS. 4D through 4F. Thus, FIG. 4D shows a climbing turn of the aircraft to the right. Under these conditions, the radial grid 66 would also be rotating in a clockwise direction, affording a complete indication, to the pilot, of the movement of the aircraft. FIG. 4E shows the operating condition of the display 32 on a diving turn to the left. Under these conditions, the radial grid 66 also rotates in a counterclockwise direction. In either case, speed grid 65 may also be moving if the aircraft is accelerating forwardly or rearwardly.

FIG. 4F shows the aircraft making a command turn to the right. Command indicator 67 is located in the right-hand upper quadrant of the display field and the pilot has manipulated the aircraft controls to bring the aircraft indicator 64 into alignment with command pointer 67 while maintaining altitude by keeping the indicator on the horizon line 61.

FIG. 5 presents, in exploded perspective form, an illustration of one form of mechanism that may be employed for display device 32. As shown therein, the face of the display comprises a panel 31A which may constitute an integral part of the performance display panel 31. At the center of this panel there is a transparent window 32A outlining the attitude display; the vertical center line 69 may be carried by the window 32A.

Immediately behind panel 31A is the mechanism employed to move attitude indicator 64 across the display field. This mechanism comprises a frame including a base member 171 and two vertical members 172 and 173. A pair of horizontal shafts 174 and 175 are journalled in suitable bearings in vertical frame members 172 and 173 and extend across the frame between the vertical frame members. Shaft 174 extends outwardly of the frame, to the left-hand side thereof as seen in FIG. 5. This shaft comprises the output shaft of a pitch sensing device 125A, which is described in detail hereinafter.

A pair of pulleys 176 are mounted upon shaft 174 for rotation therewith, being located near the ends of the shaft. A corresponding pair of pulleys 177 are affixed to shaft 175 in alignment with pulleys 176. A pair of flexible drive belts or like members 178 connect the pulleys 176 to the pulleys 177, so that shaft 175 rotates in the same direction and at the same speed as shaft 174.

A transparent slide 179 extends across the mechanism between the two drive belts 178. The opposite ends of the slide are secured to the individual belts, so that the slide moves upwardly and downwardly within the frame in response to rotation of shaft 174.

The display mechanism of FIG. 5 further includes an elongated forwardly extending shaft 181 that is the output shaft of a roll sensing device 101A. Device 101A is described in detail hereinafter. Shaft 181 extends through suitable bearings 182 mounted upon frame member 171, projecting forwardly from the frame toward panel 31A. The forward end of shaft 181 is bent at an angle of 90°, projecting upwardly as the shaft extension 183. Shaft extension 183 projects through the aircraft indicator 64, the mounting arrangement being such that the aircraft indicator is free to move longitudinally of shaft extension 183 but cannot rotate with respect to the shaft extension. A short rearwardly-extending shaft 184 secured to indicator member 64 projects into an elongated slot 185 in the slide 179.

Immediately behind frame 171–173, there is a second frame comprising a base member 186 and two vertically extending side members 187 and 188. Base member 186 may be physically integrated with the first base frame member 171 and, indeed, the side frame members may also be integrated in the two frames. A mask 62A, defining the sky area of the display, is interposed between the upper halves of the two frames.

A pair of shafts 191 and 192 extend between side frame members 187 and 188, being supported by the frame members and being journalled in suitable bearings in the frame members. Shaft 191 has a roller 193 mounted on the shaft for rotation therewith. A similar roller 194 is affixed to shaft 192. A flexible belt 195 extends around the two rollers 193 and 194. The horizontal grid lines 65 comprising the speed scale are printed, painted, or otherwise applied to the surface of belt 195. A fabric or elastomer material can be used for the belt 195; another suitable material for the belt is a flexible polyester resin available under the trade name Mylar.

Base member 186 is provided with a pair of upwardly extending support members 196 and 197. A pair of flanged guide rollers 198 and 199 are mounted upon support members 196 and 197, respectively. These guide rollers support a large transparent plastic disc 201 upon which the direction scale comprising the radial grid lines 66 is printed, painted, or otherwise inscribed. The peripheral edge of disc 201 may be in the form of a series of gear teeth engaged by a flanged drive gear 202 mounted upon a shaft 203. Shaft 203 is the output shaft from the heading differential 120. Alternatively, a friction drive may be used between shaft 203 and disc 201. The same drive is used for the heading scale 57 of compass 36; see FIG. 2.

In operation, changes in pitch of the aircraft are reflected by rotation of the output shaft 174 of the pitch sensing device 125A. If the aircraft starts to climb, the nose of the aircraft tilting upwardly, shaft 174 is rotated in a counterclockwise direction, raising slide 179. Since attitude indicator 64 is connected to the slide through shaft 184, the indicator moves upwardly behind the window 32A. If the nose of the aircraft tilts downwardly, shaft 174 rotates in a clockwise direction. Slide 179 then moves downwardly and thus moves attitude indicator 64 downwardly. For level flight, the slide 179 is maintained in alignment with the top of the belt 195 as it passes over roller 193, this being the horizon line for the display.

Rolling movement of the aircraft is reflected in rotational movement of the output shaft 181 of roll sensing device 101A. If the aircraft rolls in one direction, indicator 64 is pivoted, due to its connection to shaft 181 through the shaft extension 183. Rolling motion of the aircraft in the opposite direction results in rotation of the attitude indicator in the opposite sense.

Shaft 191 is the output shaft of the speed differential device 136. If the plane exceeds the preset speed for the planned flight, shaft 191 rotates in a clockwise direction, moving the face portion of belt 195 downwardly to give the pilot a direct sensation of excessive acceleration. If the aircraft falls below the planned speed, then shaft 191 rotates in a counterclockwise direction and the horizontal grid lines 65 on belt 195 move upwardly to show the pilot that an increase in speed is necessary. Changes in heading are reflected in rotation of shaft 203; the driving connection afforded by gear 202 rotates disc 201 to indicate to the pilot that the aircraft is turning.

*Roll attitude control system*

The principal components of the roll attitude control system used to actuate the main display 32 are shown in substantial detail in FIGS. 6 through 9. A modified form of the roll attitude sensing device that is a principal component of this system is shown in FIG. 10.

FIG. 6 illustrates, in detail schematic form, the operating circuits for the transducer 102, oscillator 104, limiting amplifier 106 and motor 108. Transducer 103 comprises a rotary transformer that includes a rotatable core 220 connected to the shaft 181 of roll sensing device 101A (FIG. 5) and carrying a winding 221. Core 220 rotates with respect to a stationary core 222 upon which are wound a primary winding 223 and a secondary winding 224. One terminal of rotatable winding 221 is returned to ground through a biasing circuit comprising a resistor 225 connected in parallel with a capacitor 226. This same terminal of winding 221 is connected to an adjustable bias voltage supply through a resistor 227. The other terminal of rotatable winding 221 is connected to one terminal of an inductance 228 which is connected in series with a capacitor 229 that is returned to ground. Capacitor 229 and coil 228 constitute the frequency-determining circuit of oscillator 104.

Oscillator 104 includes a transistor 231 having its base electrode connected to the common terminal of capacitor 229 and coil 228. The emitter of transistor 231 is connected to one end of primary winding 223 of the transformer, the other terminal of this winding being returned to ground through a parallel RC circuit comprising a resistor 232 and a capacitor 233. The collector of the transistor is connected to a negative voltage supply herein designated as C—.

The output from oscillator 104 is taken from the secondary winding 224 of the transformer. The electrical center point of the transformer winding 224 is grounded. One terminal of the winding is connected through a resistor 234 to the base electrode of a transistor 235. The other terminal of winding 224 is connected through a resistor 236 to the base electrode of a second transistor 237. The emitters of the two transistors are returned to system ground. The collector of transistor 235 is connected to the C— supply through a load resistor 238. The collector of transistor 237 is connected to the C— supply through a load resistor 239. The collector of transistor 235 is also connected back to the base electrode of transistor 231 through a feedback circuit comprising the series combination of a capacitor 241 and a resistor 242.

Transistors 235 and 237 comprise the first push-pull stage of limiter-amplifier 106; this stage functions primarily as a limiter. The second stage of the amplifier is also a push-pull circuit and comprises two transistors 245 and 247. The base electrode of transistor 245 is coupled to the collector of transistor 235 in the preceding limiter stage by a coupling circuit that comprises a series capacitor 244 and a resistor 246 that returns the base electrode to ground. A similar coupling circuit comprising a capacitor 248 and a resistor 249 couples the base electrode of resistor 247 to the collector electrode of transistor 239. The emitter electrodes of transistors 245 and 247 are returned to ground.

Motor 108 is a conventional pulse motor having a split input winding comprising two coils 253 and 254. The two windings are connected together and returned to the C— supply. One terminal of winding 253 is connected to the collector of transistor 245. The corresponding terminal of winding 254 is connected to the collector of transistor 247.

The operating circuit for the rotary transducer 102 and oscillator 104, as shown in FIG. 6, is essentially similar to the circuit described in Patent No. 2,707,232 to Robert Adler except that the present circuit is constructed with transistors instead of vacuum tubes. An essentially similar circuit is also shown in Patent No. 3,038,960 of Robert Adler and Myron L. Anthony. Accordingly, only a brief description of the circuit operation is presented herein.

Insofar as oscillator 104 is concerned, the circuit of FIG. 6 operates as an emitter follower having a frequency determined by the capacitor 229 and the inductance 228, the inductance of the transformer winding 221 being very small in comparison to coil 228. The feedback circuit of the oscillator includes the transistor 235, which is biased to operate as a limiting amplifier, and the coupling circuit comprising capacitor 241 and resistor 242. The fundamental operating frequency for the oscillator 104 is not critical, but is selected to be within the operating capabilities of motor 107. Typically, the oscillator may operate with a center frequency of the order of one hundred sixty cycles per second.

With the circuit in operation, rotation of the shaft 181 connected to core 220 may be employed to rotate the core and winding 221 and thereby develop in the winding 221 a signal which may be either a bucking or a boosting signal relative to the bias signal applied to the winding 221. For an induced signal of one polarity, the apparent capacitance of the circuit 228, 229, is increased; an induced signal of opposite polarity results in an apparent increase in the capacitance of the circuit. Accordingly, rotation of core 220 effectively increases or decreases the operating frequency of the oscillator 104, depending upon the direction of rotation. Furthermore, the amount of the frequency change is determined by the angle through which the rotary transformer core is rotated.

The output signal from oscillator 104, derived at the secondary winding 224 of the transformer, is amplified in circuit 106. This circuit functions as a limiting amplifier, producing a square wave signal of essentially constant amplitude at the output, taken from the collector electrodes of transistors 245 and 247. Pulse motor 107 is always driven in a given direction, the speed of rotation of the motor being directly related to and determined by the frequency of the output signal from oscillator 104.

As noted hereinabove, the basic circuit employed for devices 102, 104, 106 and 108 (see FIGS. 2 and 6) is also employed for the complementary portion of the roll attitude control system comprising transducer 103, oscillator 105, amplifier 107 and motor 109. Accordingly, the latter circuit is not shown in detail in the drawings. The two motors 108 and 109 (FIG. 2) drive the gear differential 110 at a rate that is determined by the difference, if any, in the output speeds of the two motors. Differential 110 is described in detail hereinafter in connection with FIG. 9.

FIGS. 7 and 8 illustrate one form of roll sensing device 101A that may be utilized as the roll sensing element 101 (FIG. 2) of the roll attitude control system. In FIG. 7, the size of device 101A has been greatly exaggerated; this view is presented solely to illustrate the orientation of device 101A in an aircraft.

As shown in FIGS. 7 and 8, device 101A comprises a frame 260 of rectangular configuration including four side frame members 261, 262, 263 and 264. Frame 260 is mounted in fixed position within the aircraft 265 (FIG. 7) with the frame members 262 and 264 extending parallel to the longitudinal axis 266 of the aircraft and with frame members 261 and 263 extending parallel to the horizontal transverse axis 267 of the aircraft.

The shaft 181 extends across frame 260 between frame members 261 and 263; it is this shaft that drives transducers 102 and 103 and attitude indicator 64 (FIGS. 2, 5, 6). Shaft 256 is aligned parallel with the longitudinal axis 266 of the aircraft and preferably is centered on that axis. Within the central opening of rectangular frame 260, a mounting ring 268 is mounted on the shaft. Preferably, the shaft 181 is constructed in two sections that are bridged by the mounting ring 268, the connection between the two shaft sections and the mounting ring being a rigid mount such that the shaft, to all intents and purposes, is continuous.

A gyro 269 comprising a small constant speed electrical motor 270 and a flywheel 271 mounted on the motor shaft is supported within mounting ring 268. With the illustrated construction, it is seen that the gyro 269 is a semi-rigid device that is limited to pivotal movement about the axis 266. Furthermore, it should be noted that axis 266 is normal to the axis of rotation 272 of the gyro.

Device 101A further includes a pendulum 273 comprising a depending rigid shaft 274 affixed to mounting ring 268 and a weight 275 that is mounted upon shaft 274. Preferably, weight 275 is threaded or otherwise adjustably mounted upon the shaft 274 so that the weight can be adjusted upwardly or downwardly of the shaft for dynamic balancing of sensing device 101. It will be seen that the mounting arrangement for pendulum 273 limits the pendulum to pivotal movement about the axis 266 which, as noted above, is parallel to or coincident with the longitudinal axis of the aircraft.

Rotational movement of shaft 181, in device 101A, is conjointly determined by the effect of the precession torque of gyro 269 and the centrifugal torque of pendulum 253. Assuming initially that aircraft 265 is rotated or rolled about its longitudinal axis 266 with no turning movement of the aircraft, it is seen that pendulum 274 rotates shaft 181 through an angle determined by the rolling movement of the aircraft. As long as there is no turning movement of the aircraft, gyro 269 applies no precession torque to the shaft. Accordingly, the rotational movement of the shaft may be taken directly as an accurate indication of the roll attitude of the aircraft.

Ordinarily, any rolling or banking movement of the aircraft is accompanied by a turning movement of the aircraft about some center, usually located a substantial distance from the aircraft. It is possible, however, to turn the aircraft without a rolling movement thereto. If it is assumed that the aircraft is engaged in a flat turn along the arc 277, it is seen that the centrifugal force of pendulum 275, indicated by the arrow CF, tends to rotate shaft 181 in a counterclockwise direction as indicated by arrow CT. That is, arrow CT represents the centrifugal torque applied to shaft 181 as a result of the angular acceleration of the aircraft.

If incorrected, torque CT would give an erroneous indication of the roll attitude of the aircraft since, as noted above, it has been assumed that the aircraft is proceeding in a perfectly flat turn and has not been banked. But gyro 269 exerts a compensating precession torque PT on shaft 181 that is directed oppositely to the centrifugal torque CT. With proper adjustment of the pendulum weight 275, the precession torque PT and the centrifugal torque CT may be equalized for a selected normal operating speed for the aricraft. Device 101A may be calibrated to permit adjustment of the weight for different speeds, such as the cruising speed of the aircraft, economy cruising speed, and like preset speeds at which the aircraft is normally operated.

In a banked turn, that portion of the torque exerted upon shaft 181 that is the result of the angular velocity of the aircraft is effectively cancelled by the opposing precession torque of gyro 269. The differential torque exerted by the pendulum as a result of banking of the aircraft results in rotational movement of shaft 181 that affords an accurate indication of the roll attitude of the aircraft. As noted above, shaft 181 is connected to the aircraft indicator 64 of the main display 32 (see FIG. 2) to provide the pilot with a continuous indication of the instantaneous roll attitude of the aircraft. As can be seen from the foregoing description, display indication is the sum of the precession torque of the gyro 269 and the free pivotal movement of the pendulum 274, the precession torque being equal to that component of the pendulum movement that is determined by centrifugal force on the pendulum resulting from turning movement of the aircraft.

Roll sensing device 101A is, of course, the input device for the circuit of FIG. 6 in the roll attitude control system. The output device is the differential 110. One form of gear differential 110A that may be employed is illustrated in FIG. 9.

As shown in FIG. 9, differential 110A includes a frame 281 of generally rectangular configuration having two hollow stub shaft 282 and 283 affixed to the frame and projecting outwardly of opposite sides of the frame in alignment with each other. The shaft 284 of motor 108 extends through hollow shaft 282 and through the wall of the frame into the central opening 286 in the interior of the frame. A small gear 285 is mounted on the end of shaft 284. Similarly, the output shaft 287 of motor 109 extends through the hollow shaft 283 into the interior opening 286 of frame 281, the two motor shafts being coaxially aligned. A small bevel gear 288 is mounted on the end of shaft 287. Gears 285 and 288 are both disposed in meshing engagement with a pair of complementary bevel gears 289 mounted upon a shaft 291 that extends across the central opening 286 of the differential frame 281 normal to the common axis of shafts 284 and 287.

A pinion gear 292 is affixed to shaft 283. Gear 292 is disposed in meshing engagement with a spur gear 294 mounted upon the output shaft 295 of the differential 110.

Gear differential devices such as device 110A are well known in the art and are commercially available. Consequently, only a brief description of operation of the gear differential is presented herein. The outputs of shafts 284 and 287 of motors 108 and 109, respectively, rotate in opposite directions. As long as the shaft speeds are equal frame 281 remains stationary. Whenever one of the motors rotates its shaft at a higher speed than the shaft for the other motor, however, this speed differential is translated into rotational movement of frame 281, through gears 285, 288 and 289. Furthermore, the direction of rotation of frame 281 is determined by and is indicative of the motor that has exceeded the speed of the other motor.

Thus, if motor 108 runs faster than motor 109, gear differential frame 281 may rotate in a clockwise direction. Conversely, if motor 109 exceeds the speed of motor 108, then the gear box rotates in a counterclockwise direction. The rotational movement of frame 281 is translated to output shaft 295 through gears 292 and 294. It is thus seen that the angular displacement of shaft 295 is the time integral of the cumulative variations in rotational speeds of motors 108 and 109 with respect to each other.

FIG. 9A illustrates the relationship between angular displacement of shaft 195 and the differential in rotational speeds of motors 108 and 109. As shown by the linear plot 298 in FIG. 9A, the shaft displacement should be a direct linear function of the speed differential and should pass through a point of zero displacement when the speeds are equal.

With an integrating device required to operate through or about a zero point, as illustrated in FIG. 9A, there is a substantial tendency toward the introduction of hysteresis error at or near the zero point. This is generally indicated by the dash line plot 299, showing the pattern followed by many integrating devices; note the distorted "dead" band near the zero point. A hysteresis error of this kind cannot be tolerated in an aircraft instrumentation system, particularly where heading or direction is derived from the time integral of the rate of turn. Generally speaking, the digitized push-pull drive and gear differential integrator system of the present system, as disclosed in FIGS. 2, 6 and 9, reduces this and other integrating errors to a minimum. Over long periods of time, observed error has been held below 0.01%.

Further reduction of hysteresis error in the integrating system, and particularly in the differential device, though normally not essential, can be accomplished by continually varying the motor speeds, complementally to each other, over a relatively small range. This may be accomplished by a small-amplitude balanced repetitive mechanical movement of the rotary transducer core 220. The resulting "dithering" movement of the rotary transducer is effective to insure against any possible introduction of a "dead" band near the zero position, of the form illustrated by dash line 299 in FIG. 9A, due to friction in the transducer or the sensing device.

FIG. 10 illustrates a modified form 101B of a roll sensing device that may be employed as the roll sensing apparatus 101 in the control system of FIG. 2. At the left-hand side of device 101B, as illustrated in FIG. 10, there is a conventional single-gimbal pivoted gyro 310 comprising a small constant speed high speed motor with a flywheel. Gyro 310 is so mounted that the pivotal axis 226A of the gyro is parallel to or coincident with the longitudinal axis of the aircraft. The rotational axis 272A of the gyro is parallel to the transverse axis of the aircraft so that the precession torque of the gyro is proportional to angular velocity of the aircraft about an axis parallel to the vertical axis of the aircraft.

A rheostat arm 311 is connected to the gyro 310, the resistance 312 of the rheostat being connected being connected in series with two batteries 313 and 314. Common terminal 315 of the batteries is connected back to the rheostat arm 311. An indicating instrument, an ammeter 316, may be included in series in this circuit. This completes a quite conventional instrument of the kind once referred to as a "turn indicator," that actually measures angular velocity of the aircraft about its vertical axis.

Device 101B further includes a pendulum 320 that is mechanically connected to a rheostat arm 321. The pivotal axis 266B of pendulum 320 is parallel to and preferably coincident with the longitudinal axis of the aircraft. Consequently, the pivotal movement of pendulum 320 represents the combined effect of rotation of the aircraft about its longitudinal axis and angular turning velocity of the aircraft about an axis parallel to the vertical axis of the aircraft.

The resistance 322 of the rheostat that includes arm 321 is connected in series with two batteries 323 and 324. The common terminal 325 is connected back to the rheostat arm 321. An indicating voltmeter 326 may be incorporated in series in this circuit. This arrangement is essentially the same as a conventional pendulum-type instrument of the kind known as a "bank indicator."

For accurate continuous indication of the roll attitude of the aircraft, a voltmeter 330 is connected between the gyro-controlled and pendulum-controlled circuits, from terminal 315 to terminal 325. Thus, instrument 330 affords an indication of the voltage differential, if any, between terminals 315 and 325. A speed correction circuit 331 may be connected to the attitude indicating instrument 330 as discussed hereinafter.

In a perfectly flat turn, arm 311 of the gyro-controlled rheostat is displaced clockwise or counterclockwise, depending upon the direction of the turn, in response to the precession torque of the gyro. At the same time, pendulum 320 is displaced angularly as a result of the angular acceleration produced by the turn. The system may be calibrated, particularly by adjustment of pendulum 320, so that the voltages across resistors 317 and 327 are equal during a flat turn. With no unbalanced condition present, attitude indicator 330 properly shows that the aircraft is maintaining level flight.

If the aircraft is rolled about its longitudinal axis, without turning, the rheostat arm 311 is not displaced, there being no precession torque output from gyro 310. But pendulum 320 is displaced in a direction and by an amount determined by the banking or rolling of the aircraft. As a consequence, a voltage of given direction and amplitude is developed across resistor 327 and this voltage is sensed and indicated by the attitude instrument 330.

In a banked turn, the gravity-induced movement of pendulum 320 resulting from banking of the aircraft is partially or completely offset by the centrifugal force applied to the pendulum as a result of angular acceleration of the aircraft. By definition, in a perfectly banked turn, the two forces are equal, gravity balancing the angular acceleration on the pendulum. Consequently, the bank circuit controlled by the pendulum remains balanced. But the turning motion of the aircraft produces a substantial unbalanced condition in the circuit controlled by gyro 310, resulting in the development of an appreciable voltage differential at terminal 315 as compared with terminal 325. The polarity of this voltage difference is determined by the direction of the turn, which is of course a function of the direction in which the plane has been banked. Consequently, the unbalanced voltage applied to attitude instrument 330 accurately reflects the changed attitude of the aircraft. In an imperfectly banked turn, of course, the voltages developed at terminals 315 and 325, and applied to instrument 330, are unequal; instrument 330 resolves the two voltages and affords a direct indication of aircraft attitude.

As in the case of device 101A, roll sensing apparatus 101B may be affected somewhat by changes in the forward speed of the aircraft. This is not a serious limitation on either device, however, since aircraft are normally operated within a rather narrow speed range. If necessary, a velocity correction signal may be applied to the attitude indicator 330 from an appropriate correction circuit 331.

A conventional meter movement suffices to drive instrument 330 for a roll attitude display not integrated with the display of additional attitude information. For an integrated display, a suitable motor may be used.

Pitch attitude control system

FIGS. 6 and 11 through 13 illustrate the principal operating components for the pitch attitude control system that controls vertical movements of attitude indicator 64 in the main display 32 (see FIGS. 1 and 2). As noted above, the digitized integrating circuits for this portion of the control system can be essentially identical to those used in the roll attitude control system and described hereinabove in connection with FIG. 6. Accordingly, there is no need to repeat the description of this portion of the pitch control system.

FIG. 11 illustrates a first simple form of pitch sensing device 125A that may be incorporated in the control system of FIG. 2 and the display mechanism of FIG. 5. Device 125A comprises a frame 340 of rectangular configuration comprising front and rear frame members 341 and 342 and opposed side frame members 343 and 344. Side frame members 343 and 344 are parallel to the longitudinal axis 266 of the aircraft.

Pitch sensing device 125A includes a pendulum 345 that is suspended from the shaft 174 comprising the output shaft for the device. Shaft 174 extends across frame 340, being supported in and journalled in suitable bearings in the side frame members 343 and 344. Thus, the axis of rotation of shaft 174, which is the rotational axis for pendulum 345, is parallel to the transverse axis of the aircraft and is normal to the longitudinal axis of the aircraft.

The front frame member 341 of frame 340 is extended and a solenoid device 133A is mounted upon the extension portion thereof. Device 133A comprises a coil that encompasses a magnetic armature 348. Armature 348 is mounted upon a support arm 349. Support arm 349 is pivotally connected to a lever 351 affixed to one end of shaft 174. Solenoid 133A is provided with suitable electrical connections and is energized in accordance with a speed correction signal derived from the discriminator differentiator circuit 132 as described hereinafter. Thus, for this particular form of pitch sensing device, solenoid device 133A represents the motor 133 shown in the control circuit diagram of FIG. 2.

In operation, when the plane remains in level flight, pendulum 345 points directly downwardly at the floor of the aricraft. If the aircraft noses down, the pendulum is displaced, rotating shaft 174 and affording a direct indication that the pitch attitude of the aircraft has changed. With the display mechanism illustrated in FIG. 5, this change in pitch is indicated by a vertical downward movement of slide 179 and, accordingly, of aircraft indicator 64. On the other hand, if the nose of the plane is brought up, pendulum 345 rotates shaft 174 in the oposite direction. This affords a positive indication of the change in pitch attitude and, with the mechanism of FIG. 5, is shown as an upward movement of the aircraft indicator 64.

The simple pendulum device of FIG. 11 would be subject to error as a result of acceleration of the aircraft, but this error is corrected by device 133A. Thus, if the aircraft is accelerated in a forward direction, the resulting inertia force IF on pendulum 345 tends to pivot shaft 174 in a counterclockwise direction, indicating that the aircraft has nosed up. But this tendency on the part of the pendulum is counteracted by the solenoid 133A, which is energized by the acceleration signal from discriminator differentiator 132. Similarly, inertia forces on the pendulum resulting from deceleration of the aircraft are compensated by solenoid 133A. With proper calibration, accordingly, device 125A may be effectively corrected for changes in acceleration of the aircraft.

Device 125A, as illustrated, leaves pendulum 345 free to rotate through a complete circular arc. Hence, the pendulum, if free of all external influences other than gravity, would point downwardly for all attitudes of the aircraft. But the acceleration correction solenoid 133A can only respond to displacements of much smaller amplitude; typically, the acceleration correction may be made operative over a total change in pitch of about plus or minus 30°. This is not a serious disadvantage, since sharp diving or climbing movements are not encouraged in the operation of most aircraft, and indeed, should be avoided, especially under IFR conditions. However, acceleration correction over a full 360° arc can be provided by substituting a permanent-magnet rotary solenoid for the simple toroidal core linear solenoid device 133A.

Even with a rotary solenoid correction device, pitch sensing device 125A is not fully accurate for aerobatic maneuvers such as a full loop. The pendulum is subject to disturbances resulting from centrifugal force if the attitude of the aircraft is changed severely as in a looping maneuver. Thus, at the end of the first 90° movement in a loop, the normal gravitational force would tend to deflect the pendulum to a position parallel to the floor of the aircraft. But the centrifugal force on the pendulum resulting from the turn of the aircraft in the vertical plane is normal to the aircraft floor and causes the pendulum to move radially outwardly from the center of the loop, resulting in a pitch indication that is not entirely accurate. Nevertheless, the direction of displacement of the pendulum is still correct with respect to the basic aircraft attitude and thus always permits correction of the aircraft to resume level flight.

FIG. 12 illustrates another embodiment of pitch sensing device in the form of a dual pendulum mechanism 125B. Device 125B comprises a base frame member 360 oriented transversely of the longitudinal aircraft axis 266 and extending substantially parallel to the horizontal aircraft axis. A pair of vertically extending hollow support and bearing members 361 and 362 are mounted at the opposite ends of frame member 360. A shaft 363 extends through bearing post 361 and projects downwardly below frame member 360. A similar shaft 174B, which is the output shaft for the device, extends through bearing post 362 and projects below frame member 360.

A first horizontal pendulum member 365 is affixed to shaft 363, the pendulum shaft projecting outwardly through bearing post 361 through a suitable slot in the bearing post. A second similar horizontal pendulum member 366 is mounted upon shaft 174B. At the top of shaft 363, a sectional gear 367 is affixed to the shaft. Gear 367 is disposed in meshing engagement with a similar gear 368 that is affixed to the upper end of shaft 174B.

A rotary solenoid motor 133B is mounted upon the central portion of frame member 360. The lower end of the shaft for motor 133B carries a pinion gear 371. Gear 371 is aligned in meshing engagement with a gear 372 that is mounted on the lower end of shaft 373. Solenoid motor 133B is electrically connected to discriminator differentiator circuit 132. A pair of springs 375 and 376, each attached to one of the bearing posts and connected to the shaft in the other bearing post, normally maintain the mechanism in the initial or zero position shown in FIG. 12.

It will be recognized that the pitch sensing device 125B, as illustrated in FIG. 12, comprises a balanced "tilt" pendulum. Again, movement of the pendulum mechanism is compensated for change in acceleration by means of the rotary motor 133B and its driving connection to the shaft 363 of pendulum 365. The pendulum assembly is spring biased to its center position, representative of level flight. The displacement of the two pendulums 365 and 366 is relatively small even for extreme changes in pitch attitude.

In the balanced pendulum mechanism of FIG. 12, the two tilt pendulums 365 and 366 are free to move only in a plane parallel to the floor of the aircraft. The orientation of the two pendulums, one on the left and one on the right, tends to cancel any transient disturbances caused by slipping motion of the aircraft in a sideways direction.

An important feature of device 125B is that it tends to minimize any disturbing effects due to centrifugal force resulting from extreme changes in pitch attitude. The centrifugal force on the two pendulums is proportional to the angular acceleration and to the sine of the angle of displacement of the pendulum with reference to the floor of the aircraft. As long as the pendulums are restrained by the springs 375 and 376 and are prevented from large excursions from their normal positions, the centrifugal force component, acting in the direction of gravity, will produce only very small disturbing forces. Thus, device 125B continues to afford substantially accurate pitch information even when the aircraft goes through relatively large pitch excursions and extremes of acceleration.

FIG. 13 illustrates a substantial portion of the operating circuits that control the pitch correction solenoid motor 133 (see FIG. 2). The initial portion of this circuit is the conventional frequency discriminator 129; because a number of suitable discriminator circuits are well known in the art, the circuit has not been shown in detail. By way of example, one suitable form of discriminator that may be employed, and that affords adequate accuracy and consistency in operation, is that shown in Patent No. 3,024,419 of Myron L. Anthony. In FIG. 13, only the output portion of discriminator 129 is illustrated, comprising the two output resistors 401 and 402, these two resistors being connected together in balanced relation and returned to system ground. Two capacitors 403 and 404 are connected in parallel with resistors 401 and 402 respectively.

The first output resistor 401 of the discriminator circuit is connected through a coupling capacitor 405 to the base electrode of a first transistor 407. Similarly, the output resistor 402 of the discriminator is coupled through a capacitor 406 to the base electrode of a transistor 408. Capacitors 405 and 406 constitute the differentiating circuit 131. The base electrode of transistor 407 is returned to ground through a resistor 411 and is also connected to a DC supply, herein designated as C—, through a resistor 413. Similarly, the base electrode of transistor 408 is connected to the C— supply through a resistor 414 and to system ground through a resistor 412.

The emitter electrodes of transistors 407 and 408 are returned to ground through two load resistors 421 and 422 respectively. The collector of each of these two transistors is connected directly to the C— supply. The emitter of transistor 407 is connected to the base electrode of a transistor 423, whereas the emitter of transistor 408 is connected to the base of a further transistor 424. The collectors of transistors 423 and 424 are each connected directly to the C— supply. The emitter electrodes of these two transistors are returned to ground by means of two respective load resistors 425 and 426. The emitter electrodes are also connected to the end terminals of a solenoid coil 427 constituting the operating winding for the solenoid motor 133.

The output signal from discriminator circuit 129, including the output resistors 401 and 402, is a push-pull DC signal. The amplitude of this signal is proportional to the air speed of the aircraft, since the operating frequency of oscillator 126 (FIG. 2) that drives the discriminator varies in frequency in accordance with air speed. The voltages applied to the base electrodes of transistors 407 and 408, through coupling capacitors 405 and 406, circuit 131, vary in accordance with the first time derivative of the air speed voltage. Accordingly, the input signal to the push-pull limiter amplifier comprising transistors 407 and 408 is proportional to the rate of change of air speed of the aircraft and hence to the acceleration of the aircraft.

Because the two input transistors 407 and 408 in the operating circuit for solenoid motor 133 are connected as emitter followers, they present a high load impedance for the discriminator output. The amplifiers comprising transistors 407 and 408 drive the second push-pull stage comprising transistors 423 and 424, the two sides of this stage also being conneced, in each instance, in an emitter follower configuration. This affords a low resistance source for energizing the operating winding 427 of the correction solenoid 133. Due to the short-circuiting effect of this low impedance source in the terminal stage of amplifier 132, the solenoid is highly damped and affords effective and controllable mechanical velocity damping to the solenoid armature and to the pitch pendulum system.

*Turn and heading control system*

As noted hereinabove, turn rate sensing device 111 may constitute a substantially conventional gyro turn indicator. Accordingly, there is no necessity for a detailed illustration or description of the mechanism employed. By the same token, the balanced digital integrating system utilized to drive differential device 120, the output device for the turn and heading control system, is essentially identical, on each side, with the arrangement described in detail hereinabove in connection with FIG. 6.

One portion of the turn and heading control system that is shown in detail in the drawings is the simple bridge circuit 121 illustrated in FIG. 14. As shown therein, the heading set device 52 is mechanically connected to a first variable resistance 431 that is connected in one leg of a bridge circuit. A second variable resistance 432 is connected in a corresponding leg of the bridge circuit. Resistance 432 is mechanically connected to the output shaft 203 of differential 120. The remaining legs of the bridge include two individual batteries or power supplies 433 and 434. The meter movement that drives command pointer 67 is connected across the bridge from the common terminal 435 of resistors 431 and 432 to the common terminal 436 of the two voltage supplies.

When the aircraft is in straight level flight on a preselected heading, resistors 431 and 432 are balanced with respect to their respective voltage supplies and the voltage and current between terminals 435 and 436 is negligible. Under these circumstances, the meter movement driving pointer 67 maintains the pointer in vertical alignment with the center line 69 of the display (see FIGS. 1 and 3), indicating to the pilot that the desired heading is being followed.

If the heading is now changed by adjusting device 52, it is apparent that the bridge circuit 121 becomes unbalanced. The pilot turns the aircraft, the turning movement being detected by sensing device 111 and integrated by the digital control circuits and associated output devices comprising motors 118 and 119 and differential 120. The output from differential 120 adjusts resistor 432. When this resistor has reached a balanced condition with respect to the setting of resistor 431, the voltage and current across the bridge are again reduced to zero and pointer 67 is returned to vertical alignment in the display.

A turning movement of the aircraft, from whatever cause, where there has been no corresponding change in the preset heading, also unbalances the bridge circuit 121. Again, the pilot must turn the aircraft to bring the differential bridge 121 into balance and return the command pointer to its normal on-heading position. In both instances, as noted above, the approach of command pointer 67 to vertical line 69 shows the pilot that he is nearing the correct heading and enables him to anticipate the necessity of flaring out of the turn, avoiding overshoot of the desired heading.

Compass 36, like bridge 121, is driven by the mechanism 120 and its associated balanced digital integrating system. In the instrumentation system of the invention, compass 36 replaces the usual gyro compass. Like a conventional gyro compass, compass 36 must be calibrated, and the calibration must be checked on occasion. But the integrating drive, based on sensing turning movements of the aircraft, that is used for compass 36, has a drift rate that is less than that of conventional gyro compasses by a factor of about ten. Hence, setting or calibration of the compass is required much less frequently than with a gyro compass.

Compass 36, and its associated control apparatus, is much less expensive than the gyro compass it effectively replaces. Furthermore, the integrating drive for compass 36 affords a much higher torque output than is available with a gyro compass, making it possible to drive the position plotter and the radial turning grid controls directly from the compass drive.

*Position display*

The position display for the system, navigation plotter 71, may take the form illustrated in FIGS. 15 and 16. FIG. 15 presents an exploded perspective view of the display whereas FIG. 16 affords a detail view of the operating mechanism employed to position the position indicator or bug 73 within the display.

As shown in FIG. 15, the position display device 71 may include a generally rectangular housing 441 encompassing the display mechanism. Housing 441 is provided with a hinged or removable lid 442 of rectangular configuration having a transparent central window 72. A transparent map 443 is removably mounted over the top of housing 441 beneath frame 442, so that the map is exposed through the window 72.

A part of the operating mechanism for moving indicator 73 is shown in FIG. 15, but FIG. 16 affords a more complete and detailed view of this mechanism. As shown therein, there are four vertically oriented shafts 451, 452, 453 and 454 located at the four corners of the navigation plotter. A first flexible drive cord or string 455 extends around four pulleys 461, 462, 463 and 464 mounted in a common plane on shafts 451, 452, 453 and 454 respectively. Starting at shaft 451, it is seen that the drive cord 455 extends parallel to one side of the display to pulley 464, around pulley 464 and diagonally of the display to pulley 462. From pulley 462, cord 455 extends parallel to the other side of the display and around pulley 463 and thence diagonally across the display to pulley 461 again.

A first slide rod 456 is incorporated in the display mechanism. Slide rod 456 is affixed, at its opposite ends, to the two sections of cord 455 that extend parallel to the sides of the display housing. Movement of slide rod 456 parallel to the sides of the housing is employed to indicate north-south movement of the aircraft. To this end, bug 73 is provided with an aperture, slide rod 456 projecting through the aperture in the indicator bug.

Indicator bug 73 is also provided with a second aperture oriented at an angle of 90° with respect to the aperture that receives slide rod 456. A second slide rod 457 extends through this second aperture in the indicator bug, the opposite ends of slide rod 457 being secured to a second drive cord 458. Drive cord 458 extends around four additional pulleys 471, 472, 473 and 474 that are mounted upon shafts 461, 462, 463 and 464 respectively.

In the drive arrangement for slide rod 456, the first three pulleys 461, 462 and 463 are rotatable upon their respective shafts. Pulley 464 is affixed to shaft 454 for rotation therewith. Adjustment knob 78 may be affixed to or otherwise mechanically connected to shaft 454 to provide for manual adjustment of the north-south position of indicator bug 73. Shaft 454 is also mechanically connected to or connectable to the output shaft 475 of differential device 152. In FIG. 16 shafts 454 and 474 are shown as a common element, but it is usually desirable to afford a simple clutch connection for the shafts so that manual adjustment knob 78 can be actuated without driving differential device 152.

Similarly, only one of the pulleys for the second drive cord 458, pulley 471, is affixed to its shaft. The remaining pulleys are freely rotatable on their respective shafts. The east-west adjustment knob 79 (FIG. 1) is mechanically connected to the drive pulley 471 for the second cord 458, which controls the positioning of slide rod 457, and the east-west differential device 153 is also connected to the same pulley.

North-south movement of indicator knob 73 is accomplished by rotation of its drive pulley 464. Thus, if the drive pulley is rotated in a clockwise direction, slide rod 456 and indicator bug 73 are both driven toward the "north" end of the map. Similarly, if drive pulley 464 is rotated in a clockwise direction, then slide rod 456 and indicator bug 73 move toward the "south" of the map. Rotation of the drive pulley may be accomplished by differential device 152 or by actuation of the adjusting knob 78. In the same manner, the drive pulley for slide rod 457 may be actuated to move indicator bug 73 to the "east" or to the "west" with respect to the map 443 overlying the indicator bug (see FIG. 15).

Position control system

FIGS. 17 and 18, when considered in conjunction with FIG. 6, illustrate the principal components of the control system utilized to drive the two differential devices 152 and 153 which, in turn, drive the navigation plotter 71 (FIG. 2). As noted above, the digital drive system shown in FIG. 6 is equally applicable to the transducer, oscillator, and amplifier that drive motor 158 in accordance with the wind speed setting adjusted by device 74. Similarly, transducer 127, oscillator 138 and amplifier 134 drive the motor 135 to afford actual air speed information in a usable form.

FIG. 17 is a partially schematic block diagram of heading computer 151. As shown therein, motor 135, which rotates at a speed proportional to the actual air speed of the aircraft, is employed to drive a pair of ball disc integrator devices 501 and 502. The second input to the computer is controlled by the position of the output shaft 203 of differential 120 (see FIG. 2), which position varies as the time integral of changes in the heading of the aircraft. Rotational displacement of shaft 203 is employed to position a control disc 502 that is mechanically connected, by two positioning rods 503 and 504, to the two ball disc integrators 501 and 502, respectively. It should be noted that the positioning rods 503 and 504 are connected to disc 502 at points displaced by exactly 90° with respect to each other so that the positions of the elements controlled by rods 503 and 504 are 90° displaced in phase with respect to each other.

FIG. 18 is a substantially simplified illustration of a ball disc integrator that may be utilized as the device 501. As shown therein, the integrator device 501 comprises a flat disc 505; disc 505 is shown directly mounted upon the output shaft 506 of motor 135. It will be understood that a suitable gear arrangement may be employed to drive the disc, since it is necessary to drive both of the integrators 501 and 502 from the motor. A ball bearing assembly comprising a pair of engaged balls 507 and 507A mounted within a suitable race member 508 is supported upon the top surface of disc 505. Race 508 is shown directly connected to the positioning rod 503; a suitable sliding yoke or other mechanical connection may be employed to obtain linear movement of race 508 in response to angular movement of rod 503. Inasmuch as there are a wide variety of known mechanical connections that are quite effective to afford the necessary translation of pivotal movement of the positioning rod to linear movement of the ball race, the yoke or other connecting mechanism has not been illustrated.

The output element of ball disc integrator 501, as shown in FIG. 18, comprises a shaft 511. Shaft 511 is disposed in frictional engagement with ball 507A of the bearing assembly. The shaft is aligned diametrically with disc 505, extending parallel to the diameter identified in the drawing by the arrows 512.

In the operation of ball disc integrator 501 (FIG. 18) disc 505 is rotated by motor 135. Since the output speed of motor 135 is determined by the air speed of the aircraft, it is seen that the rotational speed of disc 505 is proportional to the air speed. With the ball bearing assembly in the position shown in FIG. 18, near the right-hand end of diametrical line 512, the ball is rotated at maximum speed with respect to the rotational speed of the motor. Assuming that motor 135 drives shaft 506 in a clockwise direction as illustrated, ball 507A rotates in the direction indicated by arrow 513. As a consequence, shaft 511 is rotated in a clockwise direction, arrow N. It may be assumed that this is representative of movement of the aircraft toward the north. If the aircraft speeds up, the change in velocity is reflected in an increase in rotational speed in the output shaft 506 of motor 135. The resulting increase in rotational velocity of disc 505 rotates balls 507 and 507A faster and drives shaft 511 faster. The direction of rotation of shaft 511 continues to indicate that the aircraft is moving due north, still assuming that ball 507 is at the extreme right-hand end of its movement along diametrical line 512.

If the aircraft is now turned through an angle of 90° in either direction, position control disc 502 (FIG. 17) is rotated through an angle of 90°. When this occurs, the resulting pivotal movement of position rod 503 brings ball race 508 to the center of disc 505. Regardless of the rotational speed of disc 505, ball 507 is stationary when located at the exact center of the disc. Accordingly, shaft 511 is no longer rotated; thus the desired condition with the aircraft moving due east or due west, since shaft 511 is used for north-south movement of the aircraft.

If disc 502 is now rotated through an additional angle of 90°, position rod 503 reaches the alternate extreme position generally indicated by dash outline 503A. This places the ball bearing assembly at the extreme left-hand end of its travel along the diametrical line 512. Ball 507 is again rotated by its engagement with disc 505 but now rotates in the opposite direction; hence ball 507A rotates in a direction opposite arrow 513. Consequently, the output shaft 511 is now rotated, through its engagement with the ball, in a counterclockwise direction, arrow S, indicating that the aircraft is heading south. Of course, at points intermediate the two extreme positions 503 and 503A, the shaft 511 is rotated in a direction that indicates the direction of movement of the aircraft but at a speed proportional to the distance of the ball bearing assembly from the center of disc 505.

Ball disc integrator 502 is a substantial duplicate of device 501 except that it is operated 90° out of phase with respect to the north-south integrator. With positioning disc 502 in the position shown in FIG. 17, the input of motor 135 is translated by computer 151 as due north movement. Rotation of disc 502 through any angle less than 90° causes both of the integrator output shafts to be rotated. Thus, the two ball disc integrators and the positioning device 502 and 504 are effective to resolve the air speed indication comprising the output of motor 135 into orthagonal components representative, respectively, of the east-west and the north-south movements of the aircraft. Ball disc integrators such as devices 501 and 502 are commercially available and are quite accurate in their operation; accordingly, the simplified illustration of FIG. 18 is all that is necessary to afford a complete understanding of the computer mechanism.

Wind computer 154 is essentially identical to computer

151. With reference to FIG. 2, it may be seen that the computed wind speed is supplied to computer 154 by the rotation of motor 158. The position or direction of the wind is established by adjustment of the positioning disc of this computer apparatus, using wind direction setting device 75. The two output shafts of wind computer 154 are connected to differential devices 152 and 153, as are the two output shafts of computer 151, the two differential devices completing the resolution of the air speed and wind speed information necessary for driving navigation plotter 71.

SPECIFIC CIRCUIT DATA

In order to afford a more complete disclosure of the invention, by way of specific examples, specific circuit parameters are set forth hereinafter with respect to the circuits illustrated in FIGS. 6 and 13. It should be understood that these data are presented only as exemplary information and in no sense as a limitation on the invention:

Resistors

| | | |
|---|---|---|
| 227 | kilohms | 33 |
| 225, 238, 239, 246, 249, 421, 422 | do | 10 |
| 232 | do | 2.2 |
| 234, 236 | ohms | 220 |
| 242, 411, 412, 413, 414 | kilohms | 220 |
| 251, 252 | ohms | 100 |
| 425, 426 | kilohm | 1 |

Capacitors

| | | |
|---|---|---|
| 226, 233 | microfarads | 10.0 |
| 229 | do | 0.5 |
| 241 | do | 0.01 |
| 244, 248 | do | 1.0 |
| 405, 406 | do | 2.0 |

Inductances

| | | |
|---|---|---|
| 228 | henries | 2 |

Power supply

| | | |
|---|---|---|
| C− | volts D.C. | −12 |

Conclusion

From the foregoing description it will be apparent that the display system of the present invention, as illustrated particularly in FIGS. 1 through 5, presents to the pilot of an aircraft an instantly understandable display of the flight performance of the aircraft. The essential information with respect to aircraft attitude, speed, and direction of movement is presented in a manner that is essentially analogous to the corresponding information derived by the pilot when flying on the basis of visual observation, but with the aircraft itself taken as a fixed reference. For a given flight, from point to point, the pilot flies entirely by the main attitude display 32. Momentary diversion of his attention is not dangerous, since the movements of the display elements, and particularly the speed grid 65 and the turning grid 66, are easily detectible through the peripheral vision of the pilot.

In connection with the main display 32, it is important to note that, as regards the horizontal grid 65 and the radial grid 66, each adds materially to the illusion produced by the other. The presence of radial grid lines 66 in the display adds materially to the overspeed impression that is produced by downward movement of grid line 65 within the display. By the same token, the impression of turning movement of the aircraft is greatly increased by the presence of the horizontal grid lines 65 intersecting the radial grid lines 66 that actually indicate this turning movement. Neither grid is as useful, by itself, as when employed in combination with the other.

Another very important aspect of the control and display system of the present invention is the treatment of the basic roll, pitch, and turn rate information. The transformation of the initial mechanical data from the basic detecting devices, through accurate rotary transducers, into push-pull digital integrator circuits, affords a long-term accuracy for the system not previously available in known devices, much less in a system of essentially inexpensive and simple components such as that described above. The pilot is assured of accurate information without continually resetting and re-calibrating the control system, adding materially to the benefits of the system and permitting the pilot to fly by instrument with a minimum of training and a maximum of safety.

The simple and rugged mechanisms employed for the roll sensing devices 101 and the pitch sensing devices 125 are also of substantial importance in connection with the system of the present invention. Each of these devices is, in essence, a simple pendulum corrected for extraneous forces. The preferred forms of sensing apparatus described above make it possible to obtain the essential accuracy in the determination of aircraft attitude without requiring complex and expensive multi-gimbal gyro mechanisms. Furthermore, these devices afford sufficient output torque for direct drive of a display apparatus, as clearly shown in FIG. 5.

Hence, while preferred embodiments of the invention have been described and illustrated, it is to be understood that they are capable of variation and modification.

I claim:

1. An integrated performance display for aircraft instrument flying, presenting aircraft attitude and related information from the viewpoint of a pilot flying by visual observation, but with the aircraft itself taken as a fixed reference representative of the environment, comprising:
   means defining a display field having a constantly fixed reference horizon line separating an upper sky area from a lower ground area;
   an attitude indicator, located within said display field;
   means for rotating said indicator about an axis normal to the plane of said display field to indicate roll of the aircraft while the reference horizon line remains fixed;
   means for moving said indicator upward and downward normal to said horizon line, within said display field, while the reference horizon line remains fixed, to indicate pitch attitude of the aircraft;
   and means, within said display field, for displaying variations of the actual aircraft speed and heading with respect to predetermined speed and heading conditions, whereby all attitudes of the aircraft are depicted by movements of said indicator during which movements the reference horizon line remains fixed and need not be moved to depict attitudes of the aircraft relative to the ground.

2. An integrated performance display for aircraft instrument flying, presenting aircraft attitude and related information from the viewpoint of a pilot flying by visual observation, but with the aircraft itself taken as a fixed reference representative of the environment, comprising:
   means defining a display field having a constantly fixed reference horizon line separating an upper sky area from a lower ground area;
   an attitude indicator, generally simulating the silhouette of an aircraft as seen from the rear, located within said display field;
   means for rotating said indicator about an axis extending normal to the plane of said display field to indicate roll of the aircraft while the reference horizon line remains fixed;
   means for moving said indicator parallel to said horizon line, within said display field, to indicate turning of the aircraft while the reference horizon line remains fixed;
   means for moving said indicator upward and downward normal to said horizon line, within said display field, to indicate pitch attitude of the aircraft while the reference horizon line remains fixed;
   and means, within said display field, for displaying variations of the actual aircraft speed and heading with respect to predetermined speed and heading conditions whereby all attitudes of the aircraft are depicted by movements of said indicator during which movements the reference horizon line remains fixed and need not be moved to depict attitudes of the aircraft relative to the ground.

3. An integrated performance display for aircraft instrument flying, presenting aircraft attitude and related information from the viewpoint of a pilot flying by visual observation, but with the aircraft itself taken as a fixed reference representative of the environment, comprising:
   means defining a substantially planar display field having a constantly fixed reference horizon line separating an upper sky area from a lower ground area;
   an attitude indicator located within said display field;
   means for rotating said indicator about an axis extending through the center of the indicator normal to the plane of said display field to indicate roll of the aircraft while the reference horizontal line remains fixed;
   means for moving said indicator normal to said horizon line within said display field, to indicate pitch attitude of the aircraft while the reference horizon line remains fixed, whereby all attitudes of the aircraft are depicted by movements of said indicator during which movements the reference horizon line remains fixed and need not be moved to depict attitudes of the aircraft relative to the ground;
   a movable speed scale, comprising a series of spaced lines extending across said ground area of said display field, parallel to said horizon line;
   and means for moving said speed scale in a direction normal to said horizon line, toward and away from said horizon line but within said ground area of said display field, to indicate changes in the speed of the aircraft with respect to a preselected speed.

4. An integrated performance display for aircraft instrument flying, presenting aircraft attitude and related information from the viewpoint of a pilot flying by visual observation but with the aircraft itself taken as a fixed reference representative of the environment, comprising:
   means defining a substantially planar display field having a fixed reference horizon line separating an upper sky area from a lower ground area;
   an attitude indicator located within said display field;
   means for rotating said indicator about an axis extending normal to the plane of said display field to indicate roll of the aircraft;
   means for moving said indicator normal to said horizon line, within said display field, to indicate pitch attitude of the aircraft;
   a direction scale, comprising a series of spaced lines radiating from a predetermined perspective point above said horizon line, said radial lines appearing only in the ground area of said display field;
   and means for rotating said direction scale about said perspective point to indicate turning movement of the aircraft.

5. An integrated performance display for aircraft instrument flying, presenting aircraft attitude and related information from the viewpoint of a pilot flying by visual observation, but with the aircraft itself taken as a fixed reference representative of the environment, comprising:
   means defining a substantially planar display field having a fixed reference horizon line separating an upper sky area from a lower ground area;
   an attitude indicator located within said display field;
   means for rotating said indicator about an axis extending normal to the plane of said display field to indicate roll of the aircraft;
   means for moving said indicator normal to said horizone line, within said display field, to indicate pitch attitude of the aircraft;
   a movable speed scale, comprising a series of spaced lines extending across said ground area of said display field, parallel to said horizon line;
   means for moving said speed scale normal to said horizon line, within said ground area of said display field, to indicate changes in the air speed of the aircraft with respect to a predetermined air speed;
   a direction scale, comprising a series of spaced lines radiating from a predetermined perspective point above said horizon line, said radial lines appearing only in the ground area of said display field and intersecting said parallel lines of said speed scale;
   and means for rotating said direction scale about said perspective point to indicate turning movement of the aircraft relative to a predetermined heading.

6. An integrated performance display for aircraft instrument flying, presenting aircraft attitude and related information from the viewpoint of a pilot flying by visual observation but with the aircraft itself taken as a fixed reference representative of the environment, comprising:
   means defining a substantially planar display field having a fixed reference horizon line separating an upper sky area from a lower ground area;
   an attitude indicator located within said display field;
   means for rotating said indicator about an axis normal to the plane of said display field to indicate roll of the aircraft;
   means for moving said indicator normal to said horizon line, within said display field, to indicate pitch attitude of the aircraft;
   a movable speed scale, comprising a series of equally spaced horizontal lines on an endless belt extending across said ground area of said display field, said movable scale extending below said ground area and having additional similar horizontal lines in the extended portion thereof;
   masking means for limiting the view of the aircraft pilot to those lines on the movable speed scale located within the ground area of the display field;
   and means for moving said speed scale normal to said horizon line, within said ground area of said display field, to indicate changes in the speed of the aircraft.

7. An integrated performance display for aircraft instrument flying, presenting aircraft attitude and related information from the viewpoint of a pilot flying by visual observation but with the aircraft itself taken as a fixed reference, representative of the environment, comprising:
   means defining a substantially planar display field having a fixed horizon line separating an upper sky area from a lower ground area;
   an attitude indicator located within said display field;
   means for rotating said indicator about an axis extending normal to the plane of said display field to indicate roll of the aircraft;
   means for moving said indicator normal to said horizon line, within said display field, to indicate pitch attitude of the aircraft;
   a movable speed scale, comprising a series of spaced lines extending across said ground area of said display field, parallel to said horizon line;
   means for establishing a predetermined set speed for operation of the aircraft;
   and means for moving said speed scale normal to said horizon line, within said ground area of said display field, toward said horizon line to indicate that the aircraft is moving below said set speed and away from said horizon line to indicate that the aircraft is moving below said set speed and away from said horizon line to indicate that the aircraft is exceeding said set speed.

8. An integrated performance display for aircraft instrument flying, presenting aircraft attitude and related information from the viewpoint of a pilot flying by visual observation, but with the aircraft itself taken as a fixed reference representative of the environment, comprising:
   means defining a substantially planar display field having a fixed horizon line separating an upper sky area from a lower ground area;
   an attitude indicator located within said display field;
   means for rotating said attitude indicator about an axis extending normal to the plane of said display field to indicate roll of the aircraft;

means for moving said attitude indicator normal to said horizon line, within said display field, to indicate pitch attitude of the aircraft;

a nominal heading scale, located adjacent said display field, and having setting means for adjusting the nominal heading scale to a preselected heading;

an actual heading scale;

a fixed heading indicator associated with said actual heading scale and pointing toward the nose of the aircraft;

turn sensing means for sensing turning movement of the aircraft;

and integrating means, connecting said turn sensing means to said actual heading scale, for adjusting said actual heading scale relative to said heading indicator to indicate the actual heading of the aircraft as the time integral of turning movements of the aircraft, said actual heading scale being presented from a viewpoint corresponding to the axis of a compass looking outwardly to permit heading correction by turning the aircraft toward the indicated correct heading.

9. An integrated performance display for aircraft instrument flying, presenting aircraft attitude and related information from the viewpoint of a pilot flying by visual observation, but with the aircraft itself taken as a fixed reference representative of the environment, comprising:

means defining a substantially planar display field having a fixed reference horizon line separating an upper sky area from a lower ground area;

an attitude indicator, located within said display field;

means for rotating said indicator about an axis extending normal to the plane of said display field to indicate roll of the aircraft;

means for moving said indicator normal to said horizon line, within said display field, to indicate pitch attitude of the aircraft;

a turn command pointer, projecting into the sky area of said display field from the edge thereof above said horizon line;

and means for moving said turn command pointer, rotationally and translationally, within said sky area to indicate the direction in which the aircraft must be turned to reach a given heading.

10. An integrated performance display for aircraft instrument flying, presenting aircraft attitude and related information from the viewpoint of a pilot flying by visual observation but with the aircraft itself taken as a fixed reference representative of the environment, comprising:

means defining a substantially planar display field having a fixed reference horizon line separating an upper sky area from a lower ground area;

an attitude indicator, generally simulating the silhouette of an aircraft as seen from the rear, located within said display field;

means for rotating said indicator about an axis extending normal to the plane of said display field to indicate roll of the aircraft;

means for moving said indicator normal to said horizon line, within said display field, to indicate pitch attitude of the aircraft;

a movable speed scale, comprising a series of equally spaced horizontal lines extending across said ground area of said display field;

means for moving said speed scale normal to said horizon line, within said ground area of said display field, to indicate changes in the speed of the aircraft with respect to a preselected flight speed;

a direction scale, comprising a series of spaced lines radiating from a predetermined perspective point about said horizon line, said radial lines appearing only in the ground area of said display field;

means for rotating said direction scale about said perspective point to indicate turning movement of the aircraft relative to the earth;

a turn command pointer, projecting into the sky area of said display field from the edge thereof above said horizon line;

and means for moving said turn command pointer, rotationally and translationally, within said sky area to indicate the direction in which the aircraft must be turned to reach a given heading.

11. A speed and turn display for aircraft instrument flying comprising:

means defining a display field having a fixed horizon line above a ground area;

a speed scale comprising a series of spaced lines extending across said ground area of said display field, parallel to said horizon line;

means for moving said speed scale in opposite directions normal to said horizon line, within said ground area of said display field, to indicate changes in the air speed of the aircraft above and below a preselected flight speed;

a direction scale comprising a series of angularly spaced radial lines radiating from a predetermined perspective point above said horizon line, said radial lines appearing only in the ground area of said display field and intersecting said parallel lines of said speed scale;

and means for rotating said direction scale about said prespective point to indicate turning movement of the aircraft.

References Cited
UNITED STATES PATENTS

| | | | |
|---|---|---|---|
| 1,332,027 | 2/1920 | Bunker | 33—223 |
| 2,552,332 | 1/1945 | Le Van | 33—222 |
| 2,561,332 | 7/1951 | Beach et al. | 116—129 |
| 2,638,288 | 5/1953 | Hanna | 244—77 |
| 2,797,861 | 7/1957 | Garnier | 235—61 |
| 2,943,382 | 7/1960 | Fritze | 73—178 |
| 2,993,643 | 7/1961 | Holt | 235—61 |
| 3,037,382 | 6/1962 | Aid et al. | 33—204 |
| 3,094,971 | 6/1963 | Guarino et al. | 33—204 XR |
| 3,162,834 | 12/1964 | Schweighofer et al. | 73—178 XR |
| 3,208,416 | 9/1965 | Coffing | 116—129 |

LOUIS R. PRINCE, *Primary Examiner.*

D. O. Woodiel, *Assistant Examiner.*